(12) United States Patent
Law et al.

(10) Patent No.: US 10,690,937 B1
(45) Date of Patent: Jun. 23, 2020

(54) MODULAR SPECTACLES WITH MULTI-PIECE HINGE

(71) Applicant: Banjolitos, LLC, Winter Park, FL (US)

(72) Inventors: Sean Patrick Law, Winter Park, FL (US); Charles Robert Barnett, III, Winter Park, FL (US)

(73) Assignee: Banjohtos, LLC, Winter Park, FL (US)

( * ) Notice: Subject to any disclaimer, the term of this patent is extended or adjusted under 35 U.S.C. 154(b) by 0 days.

(21) Appl. No.: 16/656,377

(22) Filed: Oct. 17, 2019

(51) Int. Cl.
  *G02C 5/22* (2006.01)
  *G02C 5/00* (2006.01)
  *G02C 5/14* (2006.01)
  G02C 5/16 (2006.01)

(52) U.S. Cl.
  CPC .............. *G02C 5/22* (2013.01); *G02C 5/146* (2013.01); *G02C 5/2218* (2013.01); G02C 5/008 (2013.01); G02C 5/16 (2013.01); G02C 2200/08 (2013.01)

(58) Field of Classification Search
  CPC .......... G02C 5/16; G02C 5/146; G02C 5/006; G02C 5/22; G02C 5/2218; G02C 5/2263; G02C 2200/08
  USPC ................................. 351/153, 114, 116, 121
  See application file for complete search history.

(56) References Cited

U.S. PATENT DOCUMENTS

| | | | | |
|---|---|---|---|---|
| 1,467,946 A | * | 9/1923 | Morris ..................... | G02C 5/22 16/228 |
| 1,504,212 A | * | 8/1924 | Carlson ................ | G02C 5/2209 351/153 |
| 2,305,562 A | * | 12/1942 | Thompson ........... | G02C 5/2209 403/159 |
| 3,025,762 A | * | 3/1962 | Vigano ................ | G02C 5/2254 351/153 |
| 3,155,982 A | * | 11/1964 | Baratelli ................ | G02C 5/146 2/12 |
| 3,156,756 A | * | 11/1964 | Seaver ..................... | G02C 5/22 351/153 |

(Continued)

FOREIGN PATENT DOCUMENTS

| | | | | |
|---|---|---|---|---|
| FR | 2980590 A1 | * | 3/2013 | .......... G02C 5/2209 |
| WO | WO-2018207962 A1 | * | 11/2018 | ............... G02C 5/14 |
| WO | WO-2019069335 A1 | * | 4/2019 | ............. G02C 5/146 |

OTHER PUBLICATIONS

Banjolitos Glasses. "Banjolitos—Your Eyewear Should Change." YouTube, YouTube, Oct. 4, 2019, www.youtube.com/watch?time_continue=22&v=ZugCYVJ2-94&feature=emb_logo. (Year: 2019).*

*Primary Examiner* — Zachary W Wilkes
(74) *Attorney, Agent, or Firm* — Mark Terry

(57) ABSTRACT

Modular spectacles that are assembled and disassembled without the use of tools are disclosed. The modular spectacles comprise a pair of lenses, a frame element including a pair of rims defining orifices for accepting the pair of lenses, and a slot located on each side of the frame element, and a pair of three-part hinge sets, each three-part hinge set comprising a first hinge part including an orifice on one end and a compressible end on the other end, a second hinge part including a cutout on one end and a compressible end on the other end, and a third hinge part including an orifice on one end and a compressible end on the other end, wherein the three-part hinge set fits securely within a slot in the frame element. The modular spectacles further comprise a pair of temples, that are inserted securely into the hinge sets.

15 Claims, 20 Drawing Sheets

(56) References Cited

U.S. PATENT DOCUMENTS

| | | | | |
|---|---|---|---|---|
| 3,339,224 | A * | 9/1967 | Neary | G02C 5/22 16/228 |
| 4,978,209 | A * | 12/1990 | Ohba | G02C 5/008 16/228 |
| 5,418,581 | A * | 5/1995 | Conway | G02C 5/2209 351/116 |
| 5,596,789 | A * | 1/1997 | Simioni | G02C 5/2209 16/224 |
| 7,108,372 | B2 * | 9/2006 | Li | G02C 5/10 16/228 |
| 7,712,894 | B2 * | 5/2010 | Tsai | G02C 1/08 16/228 |
| 8,042,939 | B2 * | 10/2011 | Le Duy | G02C 5/008 16/228 |
| 8,832,904 | B2 * | 9/2014 | Kidouchim | G02C 5/22 16/228 |
| 8,944,591 | B2 * | 2/2015 | Li | G02C 3/003 16/228 |
| 9,377,633 | B2 * | 6/2016 | Kacavenda | G02C 5/14 |
| 9,541,770 | B2 * | 1/2017 | Marcoiu | G02C 1/08 |
| 10,133,088 | B1 * | 11/2018 | Barnett | G02C 5/001 |
| 10,247,959 | B2 * | 4/2019 | Berthoud | G02C 5/2209 |
| 2007/0121060 | A1 * | 5/2007 | Habermann | G02C 5/008 351/113 |
| 2008/0079893 | A1 * | 4/2008 | Chen | G02C 1/02 351/44 |
| 2013/0308087 | A1 * | 11/2013 | Sumitomo | G02C 5/146 351/116 |
| 2015/0055079 | A1 * | 2/2015 | Holzer | G02C 5/001 351/86 |

* cited by examiner

MODULAR SPECTACLES WITH MULTI-PIECE HINGE

CROSS-REFERENCE TO RELATED APPLICATIONS

This application claims priority to Chinese patent application number 2019106095807 filed on Jul. 8, 2019 and entitled "Modular Spectacles." The subject matter of Chinese patent application number 2019106095807 is hereby incorporated by references in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to field of spectacles or eyeglasses, and more specifically to the field of design and construction of spectacles and eyeglasses.

BACKGROUND

Eyeglasses, or spectacles, are devices consisting of glass or hard plastic lenses mounted in a frame that holds them in front of a person's eyes, typically using a bridge over the nose and arms, or temples, which rest over the ears. The lenses may be corrective lenses if the wearer requires their eyesight to be corrected. People are more likely to need eyeglasses the older they get with most people between the age of 65-75 wearing corrective lenses. Sunglasses allow better vision in bright daylight and may protect one's eyes against damage from high levels of ultraviolet light. Typical sunglasses are darkened for protection against bright light or glare.

The most common configuration of spectacles or eyeglasses comprises the lenses being secured to the frame in a substantially permanent fashion by use of an encircling band of metal or plastic which is maintained in a closed position by use of a screw, rivet or the like. In this configuration, custom lenses must be employed to fit precisely within the frame configuration used. The particular thickness of the lens, corresponding to the power and/or style of the lens, must be compatible with the particular frame selected by the wearer. As a result, significant time and effort must be expended, due to the required customization, to assemble an eyeglass assembly. Still further, a person in need of reading eyeglasses does not have a wide range of flexibility in their selection of frames due to the limited lens shape and thickness selection for that particular frame. Since typical eyeglass reader frames require a particular lens shape and thickness for compatibility purposes, a person in need of a strong powered lens would likely have a heavy, uncomfortable and cosmetically unappealing appearance.

Spectacle frames are already known in which the form remains constant while the color varies, so that they can be selected according to the user's taste. On the other hand, frames are known which have the same base frame, wherein the surface can be freely selected in the size or shape. However, the assembly of spectacles with such frames is relatively complex and must be performed usually by a specialist. In addition, the eyeglasses, and their appearance cannot be so easily changed and adapted. Therefore, in practice, users often purchase multiple different eyeglasses for situations requiring different lenses, aesthetics or colors. This can be costly for users requiring large numbers of eyeglasses for different situations.

As a result, there exists a need for improvements over the prior art and, more particularly, for simpler eyeglasses or spectacles that are more versatile and offer more options to users.

SUMMARY

Modular spectacles that are assembled and disassembled without the use of tools are disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, modular spectacles that are assembled and disassembled without the use of tools is disclosed. The modular spectacles comprise a pair of lenses, a frame element including a pair of rims defining orifices for accepting the pair of lenses and holding said pair of lenses securely, and a slot located on each side of the frame element, and a pair of three-part hinge sets, each three-part hinge set comprising a first hinge part including an orifice on one end and a compressible end on the other end, a second hinge part including a cutout on one end and a compressible end on the other end, and a third hinge part including an orifice on one end and a compressible end on the other end, wherein the orifice of the first hinge part, the cutout of the second hinge part and the orifice of the third hinge part are aligned when the first, second and third hinge parts are placed on top of each other, wherein the three-part hinge set fits securely within a slot in the frame element. The modular spectacles further comprise a pair of temples, each temple including an elongated portion and a fastener on one end, wherein when a three-part hinge set is assembled, the fastener is inserted securely into the three-part hinge set such that the temple is hingably coupled to the three-part hinge set, wherein a first set of the pair of three-part hinge sets is inserted securely into a first slot on a first side of the frame element, a first temple of the pair of temples is inserted securely into the first set of the pair of three-part hinge sets, a second set of the pair of three-part hinge sets is inserted securely into a second slot on a second side of the frame element, and a second temple of the pair of temples is inserted securely into the second set of the pair of three-part hinge sets.

Additional aspects of the disclosed embodiments will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
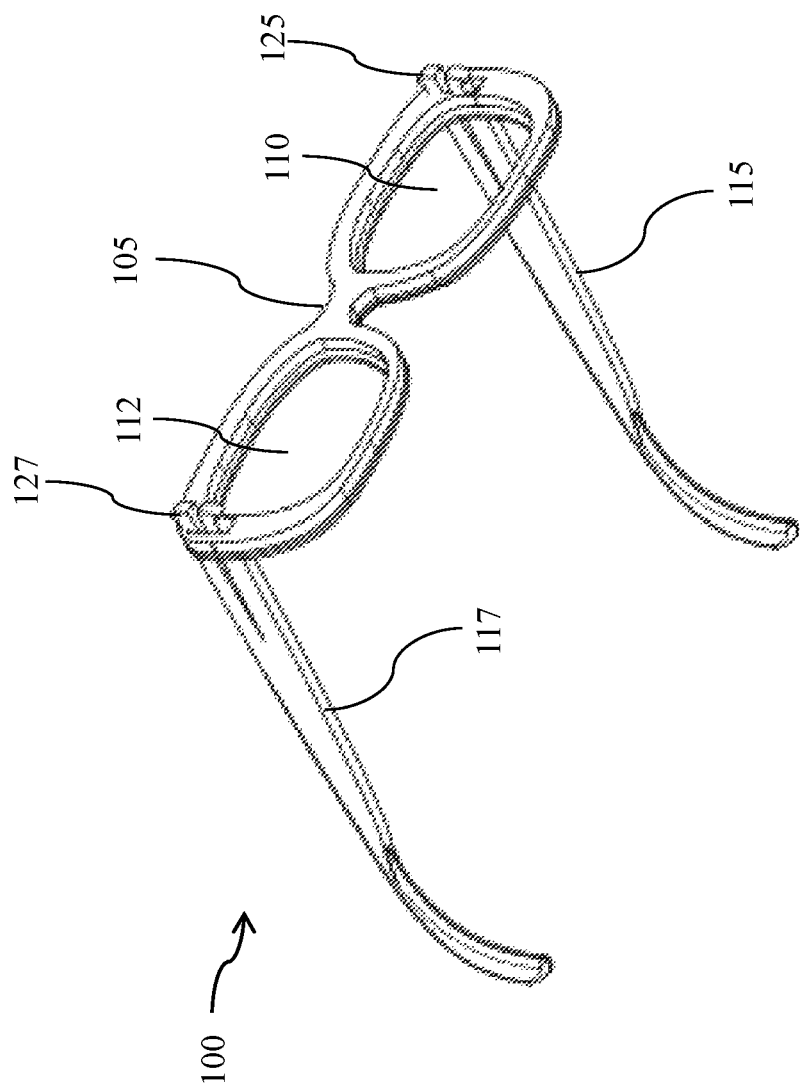
FIG. 1 is a bottom perspective view of an illustration of modular spectacles in an assembled state, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve of the prior art by disclosing a simple, inexpensive and easily used modular spectacles system wherein temples, frame members and lenses may be easily interchanged or exchanged without the use of tools and without a large expenditure of time. Thus, a wearer with a single pair of lenses may have different colors, shapes and styles of temples and frame elements available for use at any time. Therefore, a single pair of prescription lenses can be converted from a conservative office style to a sporty outdoors style in a matter of seconds without the use of tools. The disclosed embodiments therefore save significant time and effort required to assemble an eyeglass assembly. The disclosed embodiments further provide a wearer with a wide range of flexibility in their selection of frames and temples. Therefore, the disclosed embodiments reduce or eliminate the need for users to purchase multiple different eyeglasses for situations requiring different lenses, aesthetics or colors, thereby saving the user time and money.

FIG. 1 is a bottom perspective view of an illustration of modular spectacles 100 in an assembled state, according to an example embodiment. The modular spectacles 100 may be assembled and disassembled without the use of tools. The modular spectacles 100 comprise a frame assembly 105 that holds a pair of lenses 110, 112 (a left lens 110 and right lens 112) and a pair of temples 115, 117 (left temple 115, right temple 117). The proximal tip 125 of left temple 115 is seen extending through the frame assembly 105. The proximal tip 127 of right temple 117 is also seen extending through the frame assembly 105. The temples 115, 117 comprise extended arms located on the sides of the frame assembly 105 that extend from the frame assembly 105 and over the ears to keep the spectacles on the wearer's face.

Figure 2:
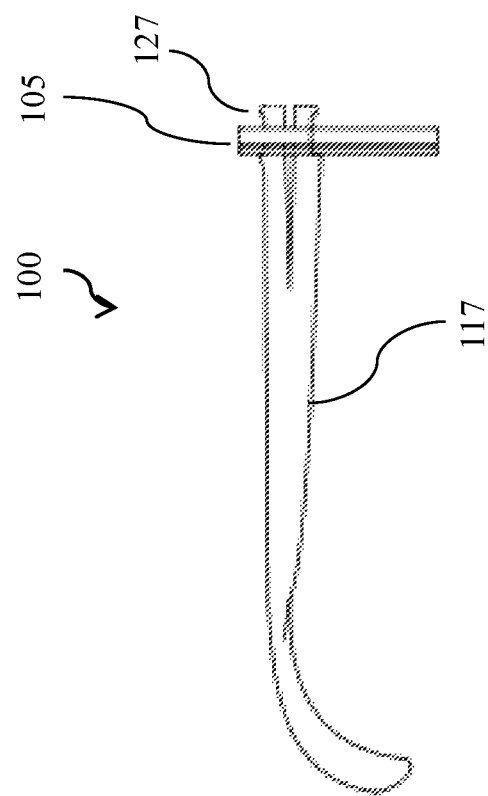
FIG. 2 is a side view of an illustration of the modular spectacles in an assembled state, according to an example embodiment.

FIG. 2 is a side view of an illustration of the modular spectacles 100 in an assembled state, according to an example embodiment. FIG. 2 shows the frame assembly 105 and the proximal tip 127 of right temple 117 extending through the frame assembly 105.

Figure 3:
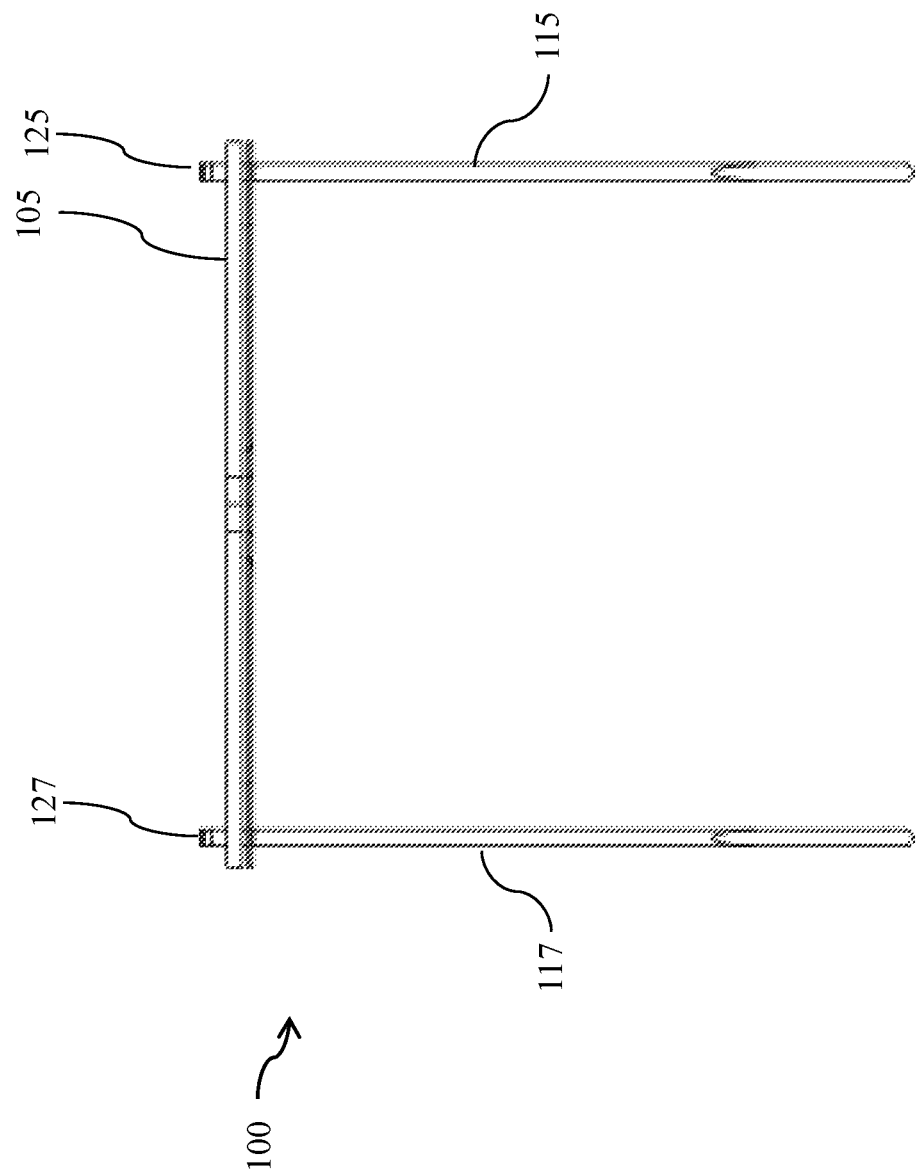
FIG. 3 is a bottom view of an illustration of the modular spectacles in an assembled state, according to an example embodiment.

FIG. 3 is a bottom view of an illustration of the modular spectacles 100 in an assembled state, according to an example embodiment. FIG. 3 shows the frame assembly 105, the proximal tip 125 of left temple 115 extending through the frame assembly 105, and the proximal tip 127 of right temple 117 extending through the frame assembly 105.

Figure 4:
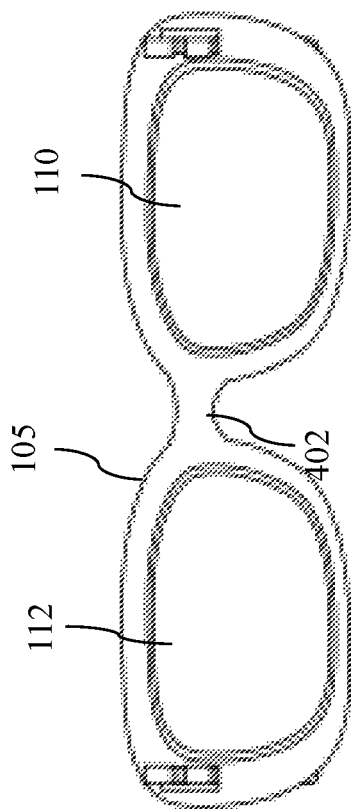
FIG. 4 is a front view of an illustration of the modular spectacles in an assembled state, according to an example embodiment.

FIG. 4 is a front view of an illustration of the modular spectacles 100 in an assembled state, according to an example embodiment. FIG. 4 shows the frame assembly 105 that holds the pair of lenses 110, 112 (a left lens 110 and right lens 112). FIG. 4 shows that the frame assembly 105 may include a pair of rims that define a pair of orifices that accept the pair of lenses, wherein the pair of rims are joined by a bridge 402. The bridge 402 extends in a region generally corresponding to the region between the eyes of the wearer. The bridge 402 is the arched piece in the front center of the frame assembly 105 that rests on the user's nose and is designed to bear most of the glasses' weight. Other suitable configurations can be used including, but not limited to, a brow bar that forms at least a portion of, or, in some embodiments, the entirety of, the bridge.

Figure 5:
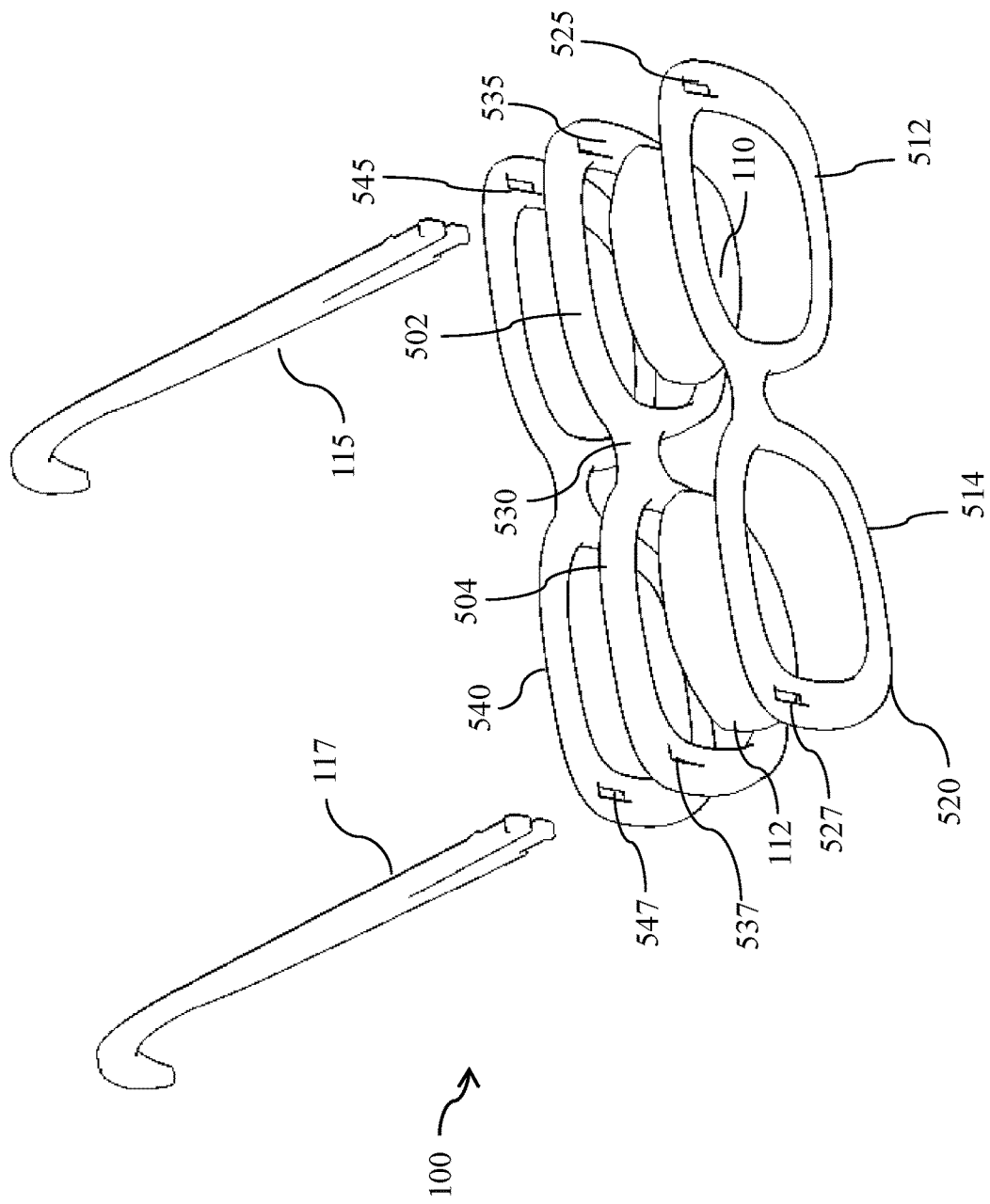
FIG. 5 is a top perspective view of an illustration of the modular spectacles in a disassembled state, according to an example embodiment.

FIG. 5 is a top perspective view of an illustration of the modular spectacles 100 in a disassembled state, according to an example embodiment. The modular spectacles 100 may be assembled and disassembled without the use of tools is disclosed. The modular spectacles 100 comprise a pair of lenses 110, 112, and the frame assembly 105 is composed of three frame elements: a front frame element 520, a middle frame element 530 and a rear frame element 540. The middle frame element 530 includes a pair of rims 502, 504 defining orifices for accepting the pair of lenses and a slot (535, 537) on each side of the middle frame element. The pair of rims 502, 504 may include a grooved or stepped cradle or inner surface (not shown) to hold the lenses 110, 112 in place. The slots 535, 537 may be rectangular, oval, circular, square, keyhole shaped, hexagonal, pentagonal, octagonal, star shaped, or the like.

The lenses 110, 112 may be of any shape or size. The modular spectacles 100 can be used with corrective or prescriptive lenses, polarized lenses, or nonprescription lenses, such as with clear accessory lenses to alter the appearance or color, or to provide protection from ultraviolet (UV) rays (UV-A and UV-B type). The lenses 110, 112 can be made of any suitable material, including standard plastic, high-index plastic, polycarbonate, trivex, hard resin (CR-39), and crown glass.

The frame assembly 105 further includes the front frame element 520 having a length that is substantially coextensive with a length of the middle frame element 530, and a slot (525, 527) on each side of the front frame element, such that when the slots of the front frame element are aligned with the slots of the middle frame element, portions of the front frame element extend over a portion of the orifices defined by the pair of rims 502, 504. That is, the orifice defined by the pair of rims 512, 514 of the front frame element 520 may be smaller than the orifice defined by the pair of rims 502, 504 of the middle frame element 530, such that portions of the front frame element extend over the orifices defined by the pair of rims 502, 504. The front frame element 520 is not provided with any lenses to be secured within the pair of rims 512, 514. The slots 525, 527 may be rectangular, oval, circular, square, keyhole shaped, hexagonal, pentagonal, octagonal, star shaped, or the like.

FIG. 5 shows that front frame element 520 has a full pair of rims 512, 514 defining substantially complete circles or ellipses. In one embodiment, the front frame element further comprises a portion that is coextensive with at least a portion of the pair of rims 502, 504 of the middle frame element 530. That is, in one embodiment, the front frame element 520 includes a pair of rims that each define a portion of a circle or ellipse, i.e., an in complete circle or ellipse.

The frame assembly 105 further includes the rear frame element 540 having a length that is substantially coextensive with the length of the middle frame element 530, and a slot (545, 547) on each side of the rear frame element 540, such that when the slots 545, 547 of the rear frame element are aligned with the slots of the middle frame element, portions of the rear frame element extend over a portion of the orifices defined by the pair of rims 502, 504. That is, as described above for the front frame element 520, the orifice defined by the pair of rims of the rear frame element 540 may be smaller than the orifice defined by the pair of rims 502, 504 of the middle frame element 530, such that portions of the rear frame element extend over the orifices defined by the pair of rims 502, 504. The rear frame element 540 is not provided with any lenses to be secured within the pair of rims of the rear frame element. The slots 545, 547 may be rectangular, oval, circular, square, keyhole shaped, hexagonal, pentagonal, octagonal, star shaped, or the like.

FIG. 5 shows that rear frame element 540 has a full pair of rims defining substantially complete circles or ellipses. In one embodiment, the rear frame element further comprises a portion that is coextensive with at least a portion of the pair of rims 502, 504 of the middle frame element 530. That is, in one embodiment, the rear frame element 540 includes a pair of rims that each define a portion of a circle or ellipse, i.e., an in complete circle or ellipse.

The modular spectacles 100 also include a pair of temples 115, 117 with compressible ends that fit securely within the slots in the front, rear and middle frame elements, such that when said compressible ends are compressed, inserted into said slots, and released, said compressible ends expand and are secured within said slots. When the pair of lenses 110, 112 are placed within the pair of rims 502, 504, the middle frame element is placed between the front and rear frame elements such that the slots of the middle frame element align with the slots of the front and rear frame elements, and the compressible ends of the pair of temples are inserted into the slots of the front, rear and middle frame elements and released, such that the front, rear and middle frame elements are secured together, then the pair of lenses are held securely in place by the front, rear and middle frame elements.

Figure 6:
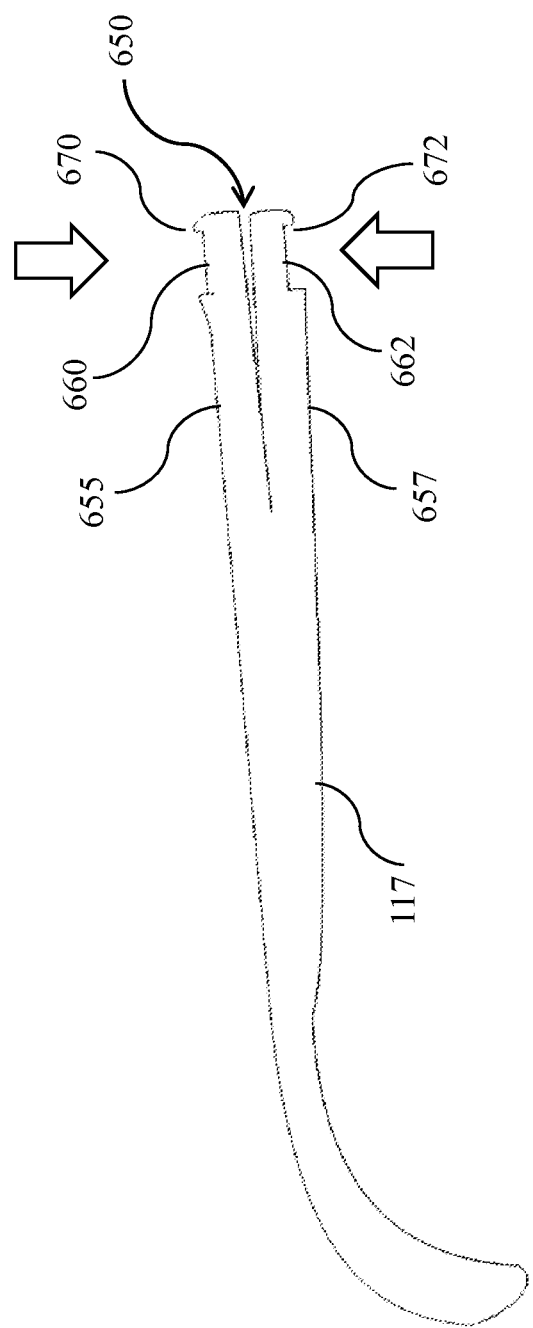
FIG. 6 is a side view of an illustration of the temple of the modular spectacles, according to an example embodiment.

FIG. 6 is a side view of an illustration of the temple 117 of the modular spectacles 100, according to an example embodiment. The right temple 117 comprises a pair of split arms 655, 657 extending out in a V-formation, defining a V-shaped slit 650 running longitudinally along the longitudinal main axis of the temple. The right temple 117 includes square shaped carve-out portions 660, 662 on the distal end of each of the split arms 655, 657. The carve outs define protruding or perpendicular elements 670, 672 that extends perpendicularly from the distal end of each of the split arms 655, 657. The arrangement above results in the temple 117 having a compressible end, in that the distal ends of temple 117 can be compressed using one's fingers (in the direction of the arrows in FIG. 6), such that the split arms 655, 657 are brought together. In this fashion, when compressed, the ends of the split arms 655, 657 may be inserted into the slots of the rear, middle and front frame elements 540, 530, 520 when the frame elements are stacked in a sandwich formation. Once inserted into said slots, the compressible ends may be released, which results in the compressible ends expanding (in a direction opposite to the arrows in FIG. 6) and pushing against the interior surface of the slots of the rear, middle and front frame elements. The interior surface of the slots of the rear, middle and front frame elements rest against the square shaped carve-out portions 660, 662 on the distal end of each of the split arms 655, 657. The protruding or perpendicular elements 670, 672 that extends perpendicularly from the distal end of each of the split arms 655, 657 prevent the rear, middle and front frame elements from being pulled outwards and away from the temples. Therefore, the temples maintain the rear, middle and front frame elements securely in place.

Figure 7:
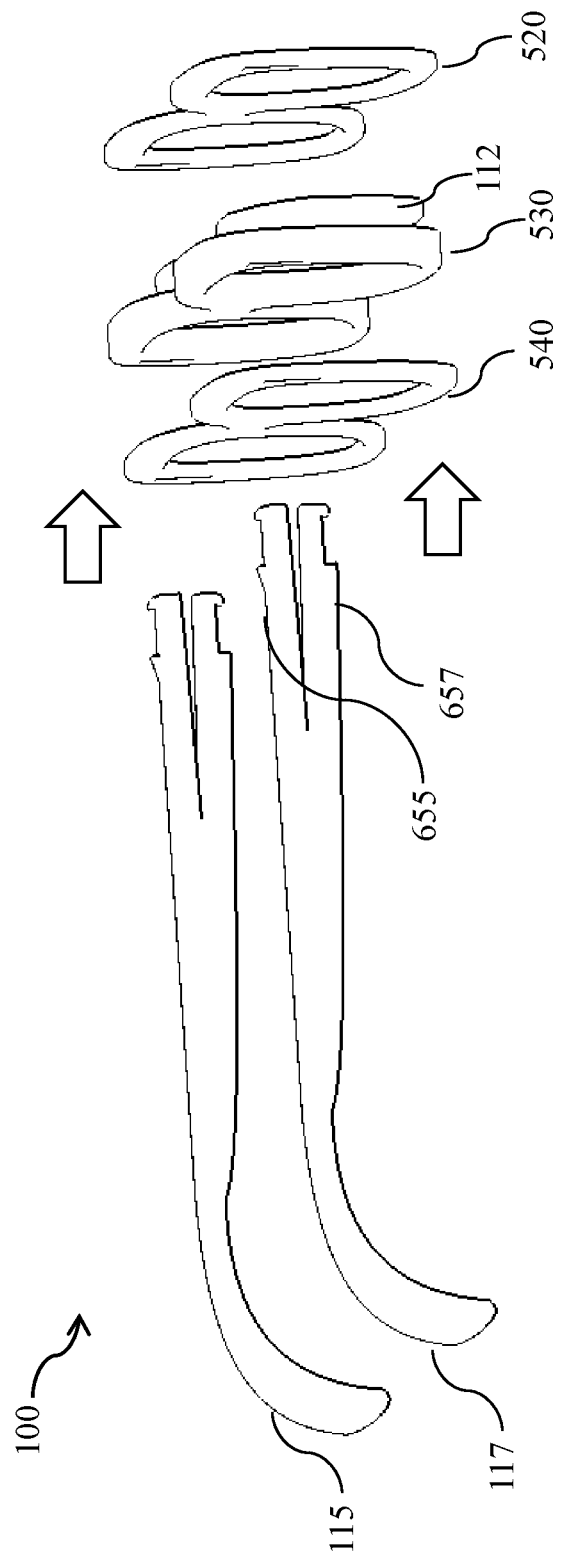
FIG. 7 is a side perspective view of an illustration of the modular spectacles in a disassembled state, according to an example embodiment.

FIG. 7 is a side perspective view of an illustration of the modular spectacles 100 in a disassembled state, according to an example embodiment. FIG. 6 shows how the rear, middle and front frame elements 540, 530, 520 are stacked in a sandwich formation, with the temples 115, 117 acting as the fastener that fastens the rear, middle and front frame elements together.

As explained above, the compressible ends of the temples 115, 117 can be compressed using one's fingers, such that the split arms 655, 657 are brought together. In this fashion, when compressed, the ends of the split arms may be inserted into the slots of the rear, middle and front frame elements 540, 530, 520 when they are stacked in a sandwich formation. Therefore, the temples maintain the rear, middle and front frame elements securely in place.

The modular spectacles 100 are assembled as follows. First, the lenses 110, 112 are placed in the grooved cradle (not shown) of the rims 502, 504 of the middle frame element 530. Next, the middle frame element 530 is aligned and stacked in between the front frame element 520 and the rear frame element 540 such that slot 527 aligns with slots 537 and 547 and such that slot 525 aligns with slot 535 and sot 545. The orifices defined by the rims of the front frame element 520 and the orifices defined by the rims of the rear frame element 540 have a smaller diameter than the rims 502, 504 of the middle frame element 530, such that the lenses 110, 112 in the middle frame element 530 are secured in place by the front and rear frame elements.

Next, the split arms 655, 657 of the temple 117 are squeezed or compressed by hand (using finger strength) and inserted in the direction of the arrow (shown in FIG. 7) through the slots 527, 537, 547 of the front, middle and rear frame members. Also, the split arms of the temple 115 are squeezed and inserted in the direction of the arrow (shown in FIG. 7) through the slots 525, 535, 545 of the front, middle and rear frame members. Once the temples are fully inserted, the split arms are released, and the carve-out portions press against the interior surfaces of the slots and lock the front, middle and rear frame elements in place.

The modular spectacles 100 are disassembled as follows. The split arms 655, 657 of the temple 117 are squeezed by hand (using finger strength) and removed opposite to the direction of the arrow (shown in FIG. 7) from the slots 527, 537, 547 of the front, middle and rear frame members. Also, the split arms of the temple 115 are squeezed and removed opposite to the direction of the arrow (shown in FIG. 7) from the slots 525, 535, 545 of the front, middle and rear frame members. Once the temples 115, 117 are removed, the front and rear frame elements can be taken off the middle frame element, and the lenses 110, 112 are no longer held in place. The modular spectacles 100 are now fully disassembled.

Figure 8:
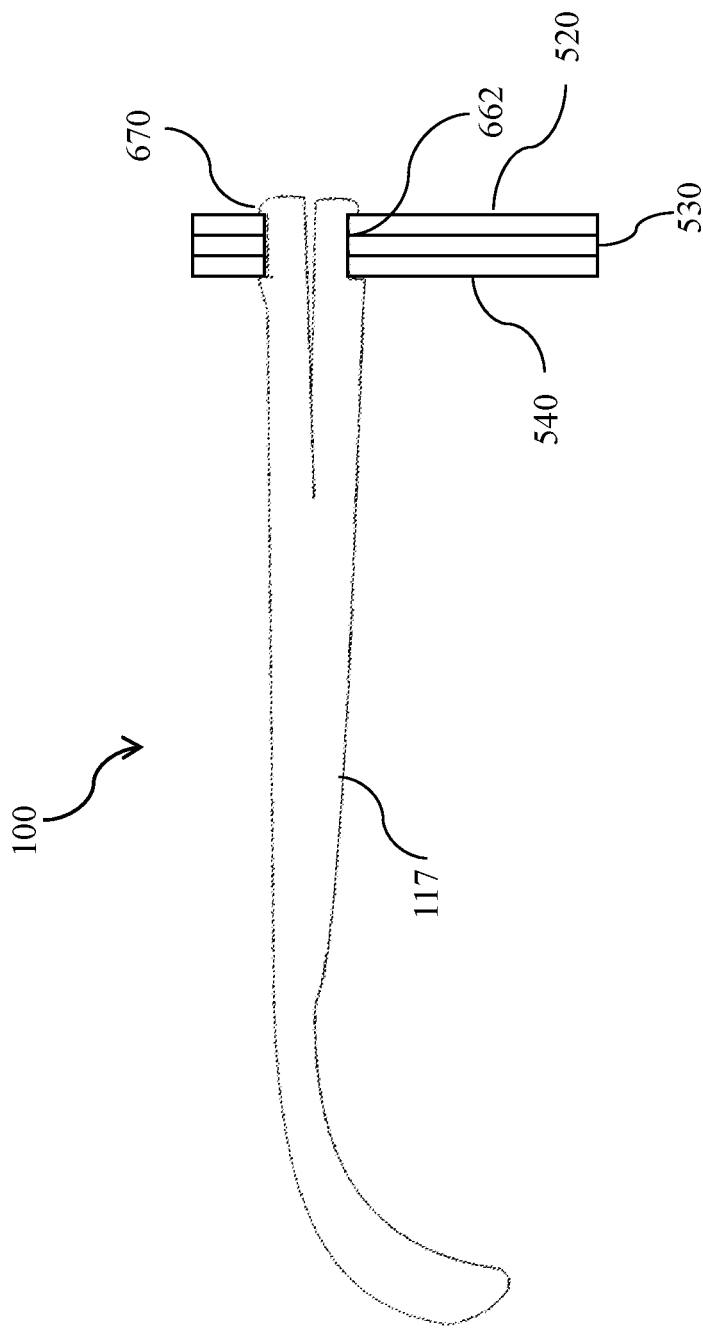
FIG. 8 is a side cross sectional view of an illustration of the modular spectacles, according to an example embodiment.

FIG. 8 is a side cross sectional view of an illustration of the modular spectacles 100, according to an example embodiment. FIG. 8 shows a cross section along a main longitudinal axis of the temple 117. FIG. 8 shows that the split arms of the temple 117 have been inserted into the slots of the rear, middle and front frame elements 540, 530, 520 when the frame elements are stacked in a sandwich formation. Once inserted, the compressible ends expand and push against the interior surface of the slots of the rear, middle and front frame elements. The interior surface of the slots of the rear, middle and front frame elements rest securely against the square shaped carve-out portions 660, 662 on the distal end of each of the split arms of temple 117. FIG. 8 shows that the square shaped carve-out portions 660, 662 are shaped precisely to fit the interior surface of the slots of the rear, middle and front frame elements. The protruding or perpendicular elements 670, 672 that extends perpendicularly from the distal end of each of the split arms 655, 657 prevent the rear, middle and front frame elements from being pulled outwards and away from the temples. Therefore, the temples maintain the rear, middle and front frame elements securely in place.

Figure 9:
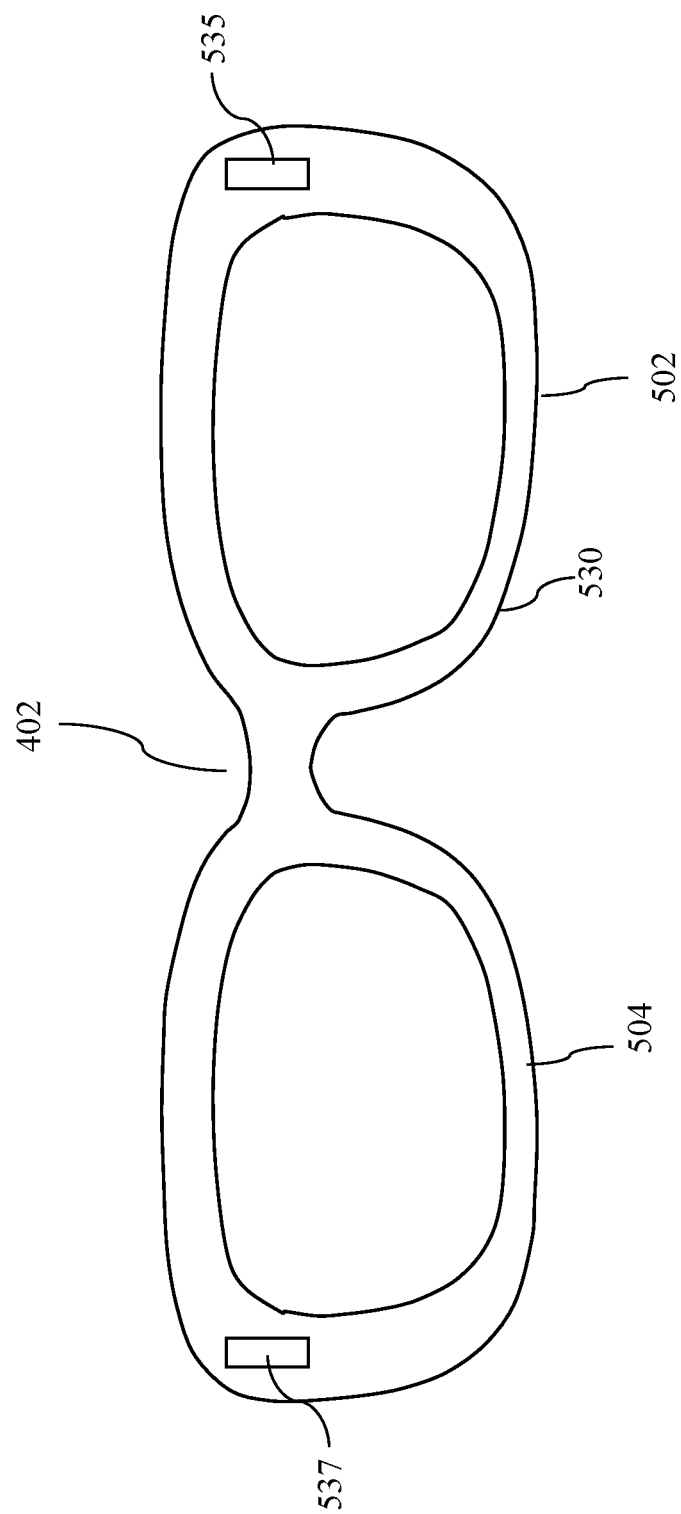
FIG. 9 is a front view of an illustration of the middle frame element of the modular spectacles, according to an example embodiment.

FIG. 9 is a front view of an illustration of the middle frame element 530 of the modular spectacles 100, according to an example embodiment. The middle frame element 530 includes a pair of rims 502, 504 defining orifices for accepting the pair of lenses and a slot (535, 537) on each side of the middle frame element. The pair of rims 502, 504 (connected by bridge 402) may include a grooved or stepped cradle or inner surface (not shown) to hold the lenses 110, 112 in place. The slots 535, 537 may be rectangular, oval, circular, square, keyhole shaped, hexagonal, pentagonal, octagonal, star shaped, or the like.

Figure 10:
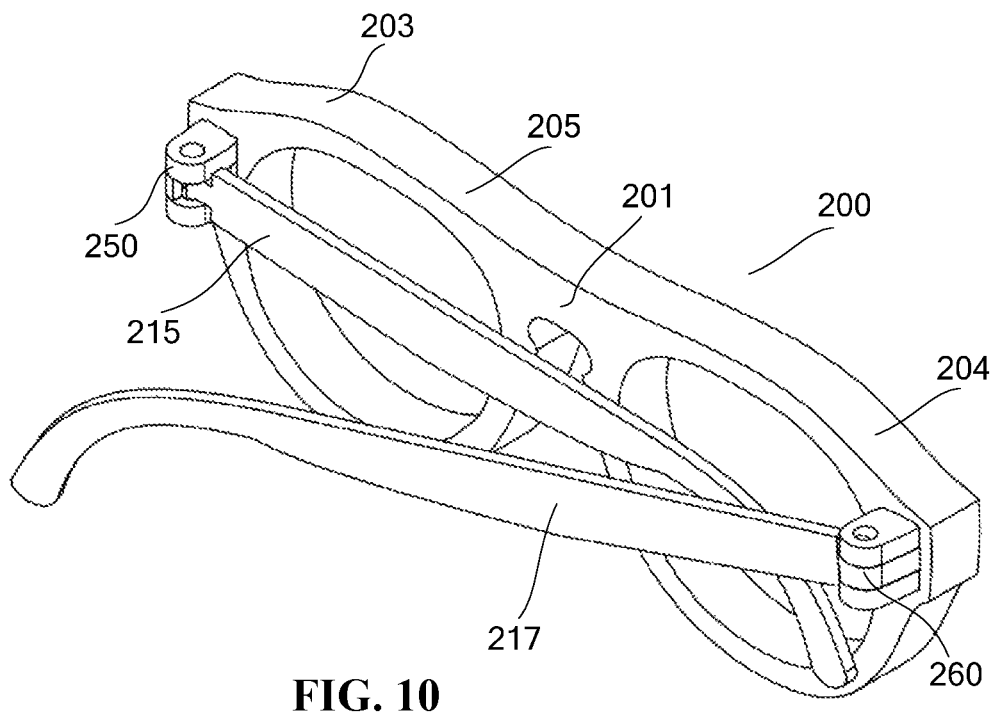
FIG. 10 is a rear perspective view of an illustration of an embodiment of the modular spectacles including a single-piece frame element, according to an example embodiment.

FIG. 10 is a rear perspective view of an illustration of an embodiment of the modular spectacles 200 including a single-piece frame element, according to an example embodiment. The modular spectacles 200 include a pair of lenses, a frame element 205 including a pair of rims defining orifices for accepting the pair of lenses and holding said pair of lenses securely, and a slot located on each side of the frame element. The modular spectacles 200 also include a pair 250, 260 of three-part hinge sets, each three-part hinge set comprising: i) a first hinge part including an orifice on one end and a hook on the other end, ii) a second hinge part including a cutout on one end and a hook on the other end, and iii) a third hinge part including an orifice on one end and a hook on the other end, iv) wherein the orifice of the first hinge part, the cutout of the second hinge part and the orifice of the third hinge part are aligned when the first, second and third hinge parts are placed on top of each other, wherein the three-part hinge set fits securely within a slot in the frame element 205.

The modular spectacles 200 also include a pair of temples 215, 217, each temple including an elongated portion and a fastener on one end, wherein when a three-part hinge set is assembled, the fastener is inserted securely into the three-part hinge set such that the temple is hingably coupled to the three-part hinge set. When the modular spectacles are assembled, three-part hinge set 250 is inserted securely into a first slot 207 on a first side of the frame element 205, and temple 215 is inserted securely into the three-part hinge set 250, and further, three-part hinge set 260 is inserted securely into a second slot 206 on a second side of the frame element 205, and temple 217 is inserted securely into the three-part hinge set 260. The slots 206, 207 may each comprise a rectangular orifice.

Figure 11:
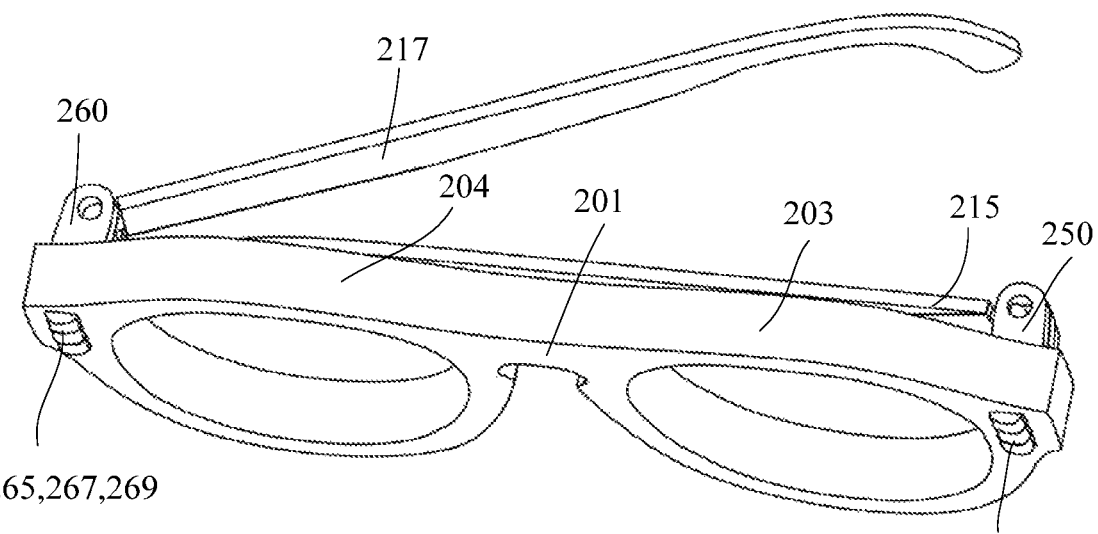
FIG. 11 is a top perspective view of an illustration of the embodiment of the modular spectacles including a single-piece frame element, according to an example embodiment.

FIG. 11 is a top perspective view of an illustration of the embodiment of the modular spectacles 200 including a single-piece frame element, according to an example embodiment. Again, the modular spectacles 200 may be assembled and disassembled without the use of tools. The modular spectacles 200 comprise a pair of lenses (a left lens and right lens), a frame element 205 that holds the pair of lenses, a pair of three-part hinge sets 250, 260 (a left-side three-part hinge set 250, and right-side three-part hinge set 260), and a pair of temples 215, 217 (a left temple 215, and right temple 217).

The frame element 205 may include a pair of rims 203, 204 that define a pair of orifices that accept the pair of lenses and holding said pair of lenses securely, wherein the pair of rims 203, 204 are joined by a bridge 201.

The left-side three-part hinge set 250 is seen extending through the frame element 205 and secured to the frame element 205. The right-side three-part hinge set 260 is also seen extending through the frame element 205 and secured to the frame element 205. The left temple 215 is seen hingably coupled to the left-side three-part hinge set 250. The right temple 217 is also seen hingably coupled to the right-side three-part hinge set 260.

Figure 12:
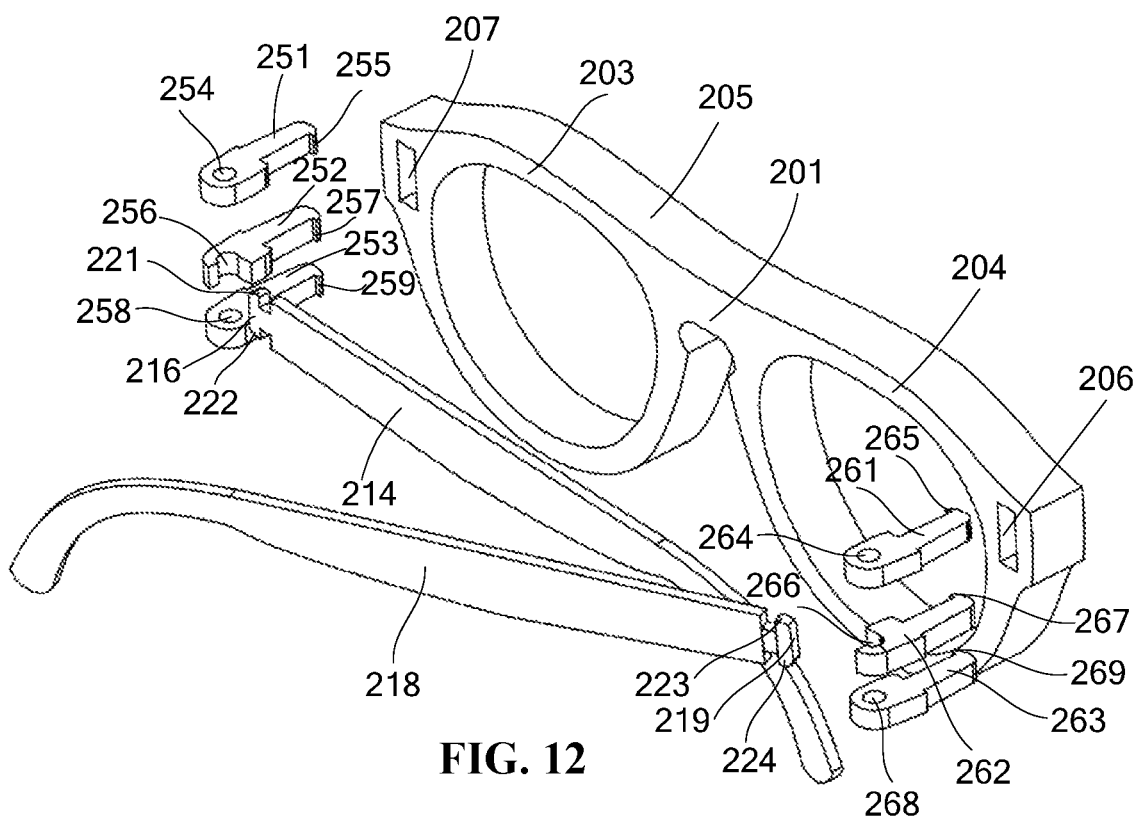
FIG. 12 is a top perspective and exploded view of an illustration of the embodiment of the modular spectacles including a single-piece frame element, according to an example embodiment.

FIG. 12 is a top perspective and exploded view of an illustration of the embodiment of the modular spectacles 200 including a single-piece frame element, according to an example embodiment. The frame element 205 includes a slot 206 located on a right side of the frame element 205 and a slot 207 located on a left side of the frame element 205. The slot 207 of the frame element 205 comprises a rectangular orifice, and the slot 206 of the frame element 205 also comprises a rectangular orifice.

The left-side three-part hinge set 250 comprises a first hinge part 251 including an orifice 254 on one end and a hook 255 on the other end, a second hinge part 252 including a cutout 256 on one end and a hook 257 on the other end, and a third hinge part 253 including an orifice 258 on one end and a hook 259 on the other end.

The orifice 254 of the first hinge part 251, the cutout 256 of the second hinge part 252 and the orifice 258 of the third hinge part 253 are aligned, and the hook 255 of the first hinge part 251, the hook 257 of the second hinge part 252 and the hook 259 of the third hinge part 253 are aligned, when the first, second and third hinge parts 251, 252, 253 are placed on top of each other. The hooks 255, 257, 259 are inserted into the slot 207 of the frame element 205, such that the left-side three-part hinge set 250 fits securely within the slot 207 of the frame element 205.

The right-side three-part hinge set 260 comprises a first hinge part 261 including an orifice 264 on one end and a hook 265 on the other end, a second hinge part 262 including a cutout 266 on one end and a hook 267 on the other end, and a third hinge part 263 including an orifice 268 on one end and a hook 269 on the other end.

The orifice 264 of the first hinge part 261, the cutout 266 of the second hinge part 262 and the orifice 268 of the third hinge part 263 are aligned, and the hook 265 of the first hinge part 261, the hook 267 of the second hinge part 262 and the hook 269 of the third hinge part 263 are aligned, when the first, second and third hinge parts 261, 262, 263 are placed on top of each other. The hooks 265, 267, 269 are inserted into the slot 206 of the frame element 205, such that the right-side three-part hinge set 260 fits securely within the slot 206 of the frame element 205.

The left temple 215 includes an elongated portion 214 and a fastener 216 on one end. When the left-side three-part hinge set 250 is assembled, the fastener 216 is inserted securely into the left-side three-part hinge set 250 such that the left temple 215 is hingably coupled to the left-side three-part hinge set 250.

The fastener 216 may be a double-hook portion and include a first hook 221 on the top, a second hook 222 on the bottom, and a middle portion between the first hook 221 and the second hook 222. The first hook 221 of the double-hook portion is inserted into the orifice 254 of the first hinge part 251 of the left-side three-part hinge set 250, the second hook 222 of the double-hook portion is inserted into the orifice 258 of the third hinge part 253 of the left-side three-part hinge set 250, and the middle portion of the double-hook portion is inserted into the cutout 256 of the second hinge part 252 of the left-side three-part hinge set 250, such that the left temple 215 is hingably coupled to the left-side three-part hinge set 250.

The right temple 217 includes an elongated portion 218 and a fastener 219 on one end. When the right-side three-part hinge set 260 is assembled, the fastener 219 is inserted securely into the right-side three-part hinge set 260 such that the right temple 217 is hingably coupled to the right-side three-part hinge set 260.

The fastener 219 may be a double-hook portion and include a first hook 223 on the top, a second hook 224 on the bottom, and a middle portion between the first hook 223 and the second hook 224. The first hook 223 of the double-hook portion is inserted into the orifice 264 of the first hinge part 261 of the right-side three-part hinge set 260, the second hook 224 of the double-hook portion is inserted into the orifice 268 of the third hinge part 263 of the right-side three-part hinge set 260, and the middle portion of the double-hook portion is inserted into the cutout 266 of the second hinge part 262 of the right-side three-part hinge set 260, such that the right temple 217 is hingably coupled to the right-side three-part hinge set 260.

The elongated portion 214 of the left temple 215 and the elongated portion 218 of the right temple 217 may extend over the ears to keep the spectacles on the wearer's face.

During assembly of the modular spectacles 200, the pair of three-part hinge sets 250, 260 are inserted through their respective slots 206, 207 at a slight angle (maybe about 80 degrees with respect to the frame element 205). After they are inserted, they are straightened (i.e. to 90 degrees with respect to the frame element 205), and the hooks of the pair of three-part hinge sets 250, 260 keeps the pair of three-part hinge sets 250, 260 securely in place attached to the frame element 205.

Figure 13:
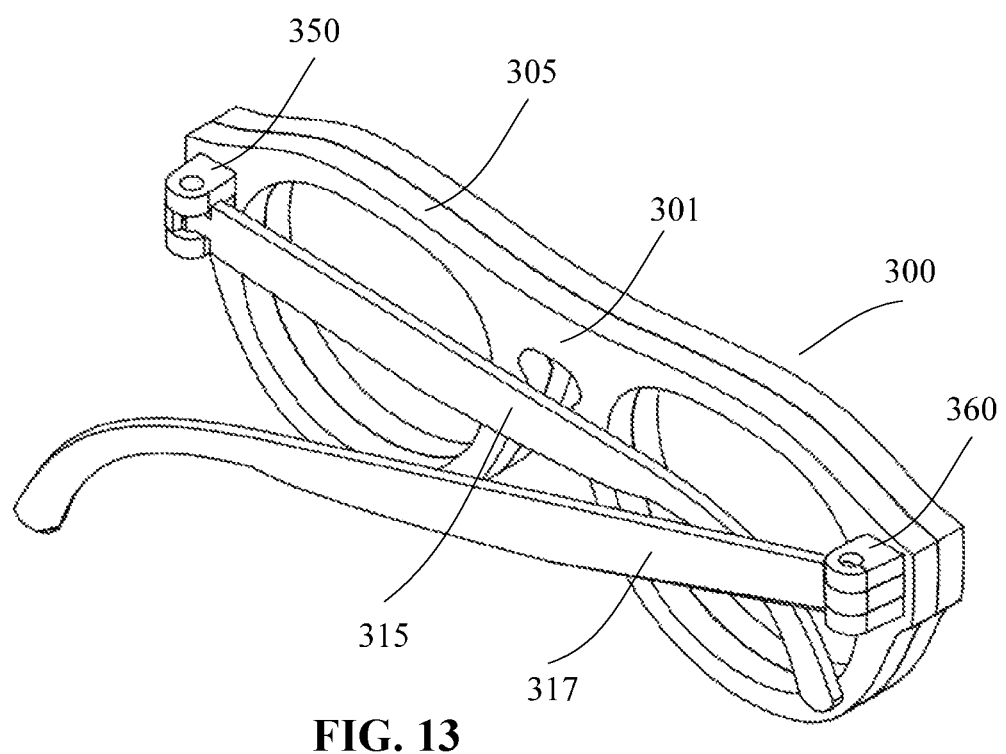
FIG. 13 is a rear perspective view of an illustration of an embodiment of the modular spectacles including a two-piece frame element, according to an example embodiment.

FIG. 13 is a rear perspective view of an illustration of an embodiment of the modular spectacles 300 including a two-piece frame element, according to an example embodiment. The modular spectacles 300 include a pair of lenses, a front frame element 320 including a pair of rims defining orifices for accepting the pair of lenses, a slot 326 on a right side of the front frame element and a slot 327 on a left side of the front frame element. The modular spectacles 300 also include a rear frame element 340 having a length that is substantially coextensive with a length of the front frame element, a slot 346 on a right side of the rear frame element and a slot 347 on a left side of the rear frame element, such that the slots 326, 327 of the front frame element are aligned with the slots 346, 347 of the rear frame element, when the front frame element 320 is placed on top of the rear frame element 340.

The modular spectacles 300 also include a left-side three-part hinge set 350 comprising a first hinge part 351 including an orifice on one end and a hook on the other end, a second hinge part 352 including a cutout on one end and a hook on the other end, and a third hinge part 353 including an orifice on one end and a hook on the other end, wherein the orifice of the first hinge part, the cutout of the second hinge part and the orifice of the third hinge part are aligned when the first, second and third hinge parts are placed on top of each other, wherein the left-side three-part hinge set fits securely within the slots 327, 347 in the left side of the front and rear frame elements, and wherein the front and rear frame elements are prevented from separating by the hooks on the first, second and third hinge parts.

The modular spectacles 300 also include a right-side three-part hinge set 360 comprising a first hinge part 361 including an orifice on one end and a hook on the other end, a second hinge part 362 including a cutout on one end and a hook on the other end, and a third hinge part 363 including an orifice on one end and a hook on the other end, wherein the orifice of the first hinge part, the cutout of the second hinge part and the orifice of the third hinge part are aligned when the first, second and third hinge parts are placed on top of each other, wherein the right-side three-part hinge set fits securely within the slots 326, 346 in the right side of the front and rear frame elements, and wherein the front and rear frame elements are prevented from separating by the hooks on the first, second and third hinge parts.

The modular spectacles 300 also include a left side temple 315 configured for hingably coupling to the left-side three-part hinge set 350, and a right side temple 317 configured for hingably coupling to the right-side three-part hinge set 360.

Figure 14:
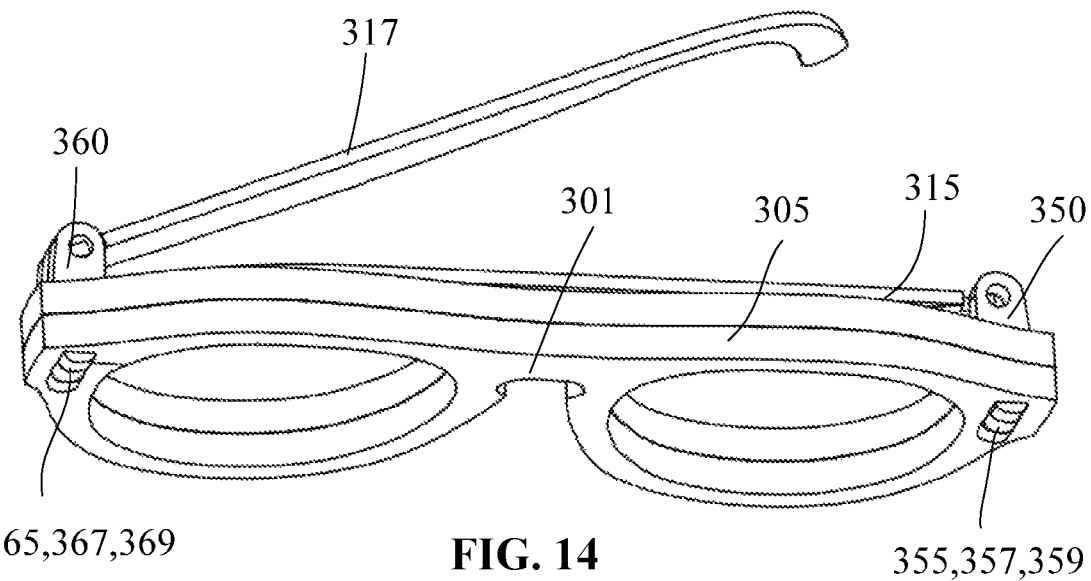
FIG. 14 is a top perspective view of an illustration of the embodiment of the modular spectacles including a two-piece frame element, according to an example embodiment.

FIG. 14 is a top perspective view of an illustration of the embodiment of the modular spectacles 300 including a two-piece frame element, according to an example embodiment. The modular spectacles 300 may be assembled and disassembled without the use of tools. The modular spectacles 300 comprise a pair of lenses (a left lens and right lens), a frame assembly 305 that holds the pair of lenses, a pair of three-part hinge sets 350, 360 (a left-side three-part hinge set 350, and right-side three-part hinge set 360), and a pair of temples 315, 317 (a left temple 315, and right temple 317). The frame assembly 305 may include a pair of rims that define a pair of orifices that accept the pair of lenses, wherein the pair of rims are joined by a bridge 301.

The left-side three-part hinge set 350 is seen extending through the frame assembly 305 and secured to the frame assembly 305. The right-side three-part hinge set 360 is also seen extending through the frame assembly 305 and secured to the frame assembly 305. The left temple 315 is seen hingably coupled to the left-side three-part hinge set 350. The right temple 317 is also seen hingably coupled to the right-side three-part hinge set 360

Figure 15:
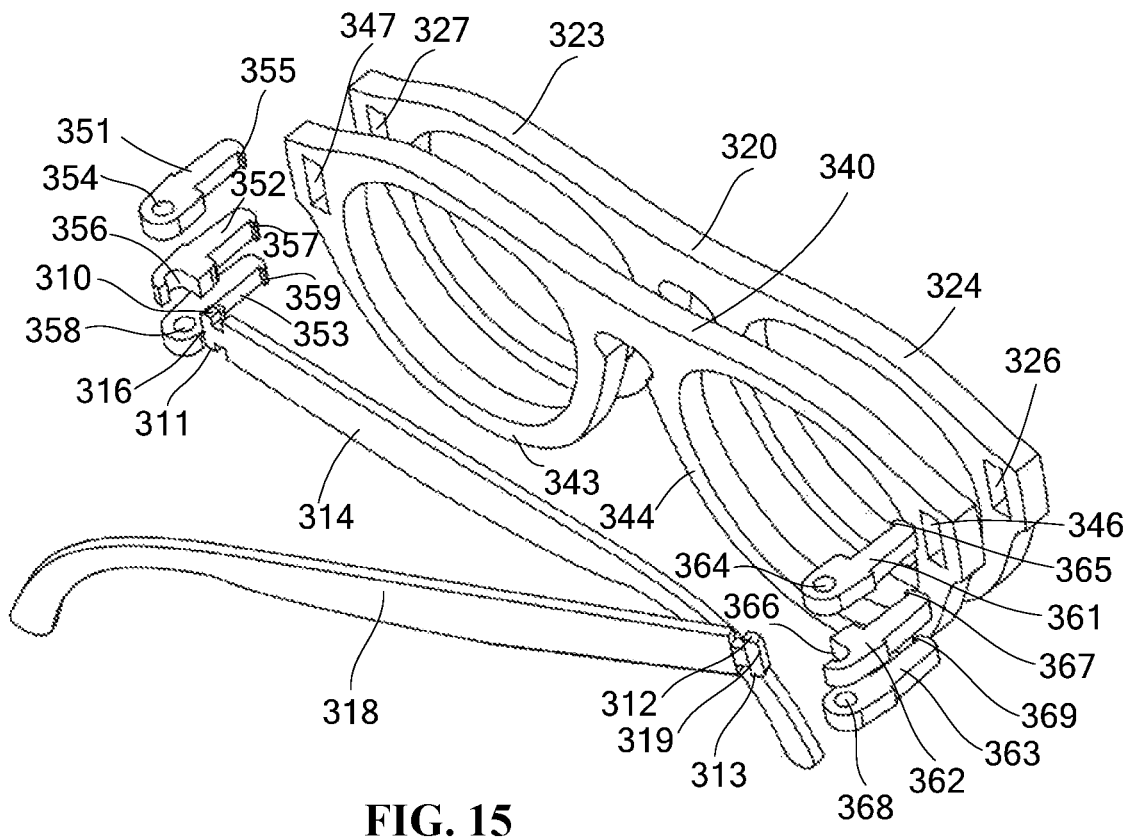
FIG. 15 is a top perspective and exploded view of an illustration of the embodiment of the modular spectacles including a two-piece frame element, according to an example embodiment.

FIG. 15 is a top perspective and exploded view of an illustration of the embodiment of the modular spectacles 300 including a two-piece frame element, according to an example embodiment. The frame assembly 305 is composed of two frame elements: a front frame element 320, and a rear frame element 340.

The front frame element 320 includes a pair of rims 323, 324 defining orifices for accepting the pair of lenses, a slot 326 on a right side of the front frame element 320, and a slot 327 on a left side of the front frame element 320. The slots 326, 327 of the front frame element 320 may comprise rectangular orifices.

The rear frame element 340 has a length that is substantially coextensive with a length of the front frame element 320, a slot 346 on a right side of the rear frame element 340 and a slot 347 on a left side of the rear frame element 340. The slots 346, 347 of the rear frame element 340 may also comprise rectangular orifices.

FIG. 15 shows that rear frame element 340 has a full pair of rims 343, 344 defining substantially complete circles or ellipses. In one embodiment, the rear frame element 340 further comprises a portion that is coextensive with at least a portion of the pair of rims 323, 324 of the front frame element 320. That is, in one embodiment, the rear frame element 340 includes a pair of rims that each defines a portion of a circle or ellipse.

When the front frame element 320 is placed in front of the rear frame element 340, the slots 326, 327 of the front frame element 320 are aligned with the slots 346, 347 of the rear frame element 340, and portions of the rear frame element 340 extend over a portion of the orifices defined by the pair of rims 323, 324. That is, the orifice defined by the pair of rims 343, 344 of the rear frame element 340 may be smaller than the orifice defined by the pair of rims 323, 324 of the front frame element 320, such that portions of the rear frame element 340 extend over the orifices defined by the pair of rims 323, 324. The rear frame element 340 is not pro-vided with any lenses to be secured within the pair of rims 343, 344.

In another embodiment, the rear frame element includes a pair of rims defining orifices for accepting the pair of lenses, the front frame element is not provided with any lenses to be secured within a pair of rims of the front frame element, and portions of the front frame element extend over a portion of the orifices defined by the pair of rims of the rear frame element.

The left-side three-part hinge set 350 comprises a first hinge part 351 including an orifice 354 on one end and a hook 355 on the other end, a second hinge part 352 including a cutout 356 on one end and a hook 357 on the other end, and a third hinge part 353 including an orifice 358 on one end and a hook 359 on the other end.

The orifice 354 of the first hinge part 351, the cutout 356 of the second hinge part 352 and the orifice 358 of the third hinge part 353 are aligned, and the hook 355 of the first hinge part 351, the hook 357 of the second hinge part 352 and the hook 359 of the third hinge part 353 are aligned, when the first, second and third hinge parts 351, 352, 353 are placed on top of each other. The hooks 355, 357, 359 are inserted into the slots 327, 347 of the front and rear frame element 320, 340, such that the left-side three-part hinge set 350 fits securely within the slots 327, 347 of the front and rear frame element 320, 340.

The right-side three-part hinge set 360 comprises a first hinge part 361 including an orifice 364 on one end and a hook 365 on the other end, a second hinge part 362 including a cutout 366 on one end and a hook 367 on the other end, and a third hinge part 363 including an orifice 368 on one end and a hook 369 on the other end.

The orifice 364 of the first hinge part 361, the cutout 366 of the second hinge part 362 and the orifice 368 of the third hinge part 363 are aligned, and the hook 365 of the first hinge part 361, the hook 367 of the second hinge part 362, and the hook 369 of the third hinge part 363 are aligned, when the first, second and third hinge parts 361, 362, 363 are placed on top of each other. The hooks 365, 367, 369 are inserted into the slots 326, 346 of the front and rear frame elements 320, 340, such that the right-side three-part hinge set 360 fits securely within the slots 326, 346 of the front and rear frame elements 320, 340.

The left temple 315 includes an elongated portion 314 and a fastener 316 on one end. When the left-side three-part hinge set 350 is assembled, the fastener 316 is inserted securely into the left-side three-part hinge set 350 such that the left temple 315 is hingably coupled to the left-side three-part hinge set 350.

The fastener 316 may be a double-hook portion and include a first hook 310 on the top, a second hook 311 on the bottom, and a middle portion between the first hook 310 and the second hook 311. The first hook 310 of the double-hook portion is inserted into the orifice 354 of the first hinge part 351 of the left-side three-part hinge set 350, the second hook 311 of the double-hook portion is inserted into the orifice 358 of the third hinge part 353 of the left-side three-part hinge set 350, and the middle portion of the double-hook portion is inserted into the cutout 356 of the second hinge part 352 of the left-side three-part hinge set 350, such that the left temple 315 is hingably coupled to the left-side three-part hinge set 350.

The right temple 317 includes an elongated portion 318 and a fastener 319 on one end. When the right-side three-part hinge set 360 is assembled, the fastener 319 is inserted securely into the right-side three-part hinge set 360 such that the right temple 317 is hingably coupled to the right-side three-part hinge set 360.

The fastener 319 may be a double-hook portion and include a first hook 312 on the top, a second hook 313 on the bottom, and a middle portion between the first hook 312 and the second hook 313. The first hook 312 of the double-hook portion is inserted into the orifice 364 of the first hinge part 361 of the right-side three-part hinge set 360, the second hook 313 of the double-hook portion is inserted into the orifice 368 of the third hinge part 363 of the right-side three-part hinge set 360, and the middle portion of the double-hook portion is inserted into the cutout 366 of the second hinge part 362 of the right-side three-part hinge set 360, such that the right temple 317 is hingably coupled to the right-side three-part hinge set 360.

Figure 16:
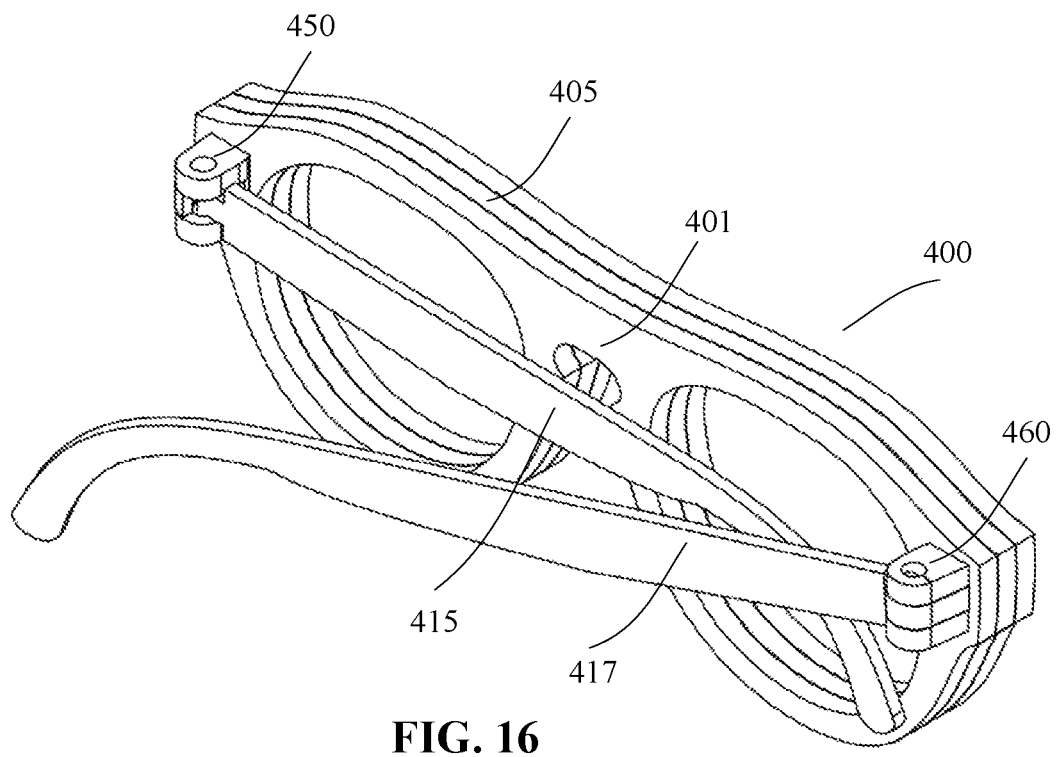
FIG. 16 is a rear perspective view of an illustration of an embodiment of the modular spectacles including a three-piece frame element, according to an example embodiment.

FIG. 16 is a rear perspective view of an illustration of an embodiment of the modular spectacles 400 including a three-piece frame element, according to an example embodiment. The modular spectacles 400 include a pair of lenses, a middle frame element including 430 a pair of rims defining orifices for accepting the pair of lenses, a slot 436 on a right side of the middle frame element and a slot 437 on a left side of the middle frame element. The modular spectacles 400 also include a front frame element 420 having a length that is substantially coextensive with a length of the middle frame element, a slot 426 on a right side of the front frame element and a slot 427 on a left side of the front frame element, such that the slots of the front frame element are aligned with the slots of the middle frame element, when the front frame element is placed on top of the middle frame element. The modular spectacles 400 also include a rear frame element 440 having a length that is substantially coextensive with the length of the middle frame element, a slot 446 on a right side of the rear frame element and a slot 447 on a left side of the rear frame element, such that the slots of the rear frame element are aligned with the slots of the middle frame element, when the rear frame element is placed on top of the rear frame element.

The modular spectacles 400 also include a left-side three-part hinge set 450 comprising a first hinge part 451 including an orifice on one end and a hook on the other end, a second hinge part 452 including a cutout on one end and a hook on the other end, and a third hinge part 453 including an orifice on one end and a hook on the other end, wherein the orifice of the first hinge part, the cutout of the second hinge part and the orifice of the third hinge part are aligned when the first, second and third hinge parts are placed on top of each other, wherein the left-side three-part hinge set fits securely within the slots in the left side of the front, rear and middle frame elements, and wherein the front, rear and middle frame elements are prevented from separating by the hooks on the first, second and third hinge parts.

The modular spectacles 400 also include a right-side three-part hinge set 460 comprising a first hinge part 461 including an orifice on one end and a hook on the other end, a second hinge part 462 including a cutout on one end and a hook on the other end, and a third hinge part 463 including an orifice on one end and a hook on the other end, wherein the orifice of the first hinge part, the cutout of the second hinge part and the orifice of the third hinge part are aligned when the first, second and third hinge parts are placed on top of each other, wherein the right-side three-part hinge set fits securely within the slots in the right side of the front, rear and middle frame elements, and wherein the front, rear and middle frame elements are prevented from separating by the hooks on the first, second and third hinge parts.

The modular spectacles 400 also include a left side temple 415 including an elongated portion and a double-hook portion on one end, wherein when the left-side three-part hinge set 450 is assembled, a first hook of the double-hook portion is inserted into the orifice of the first hinge part of the left-side three-part hinge set, a second hook of the double-hook portion is inserted into the orifice of the third hinge part of the left-side three-part hinge set, and a middle portion of the double-hook portion is inserted into the cutout of the second hinge part of the left-side three-part hinge set, such that the left side temple is hingably coupled to the left-side three-part hinge set.

The modular spectacles 400 also include a right side temple 417 including an elongated portion and a double-hook portion on one end, wherein when the right-side three-part hinge set 460 is assembled, a first hook of the double-hook portion of the right-side temple is inserted into the orifice of the first hinge part of the right-side three-part hinge set, a second hook of the double-hook portion is inserted into the orifice of the third hinge part of the right-side three-part hinge set, and a middle portion of the double-hook portion is inserted into the cutout of the second hinge part of the right-side three-part hinge set, such that the right-side temple is hingably coupled to the right-side three-part hinge set.

Figure 17:
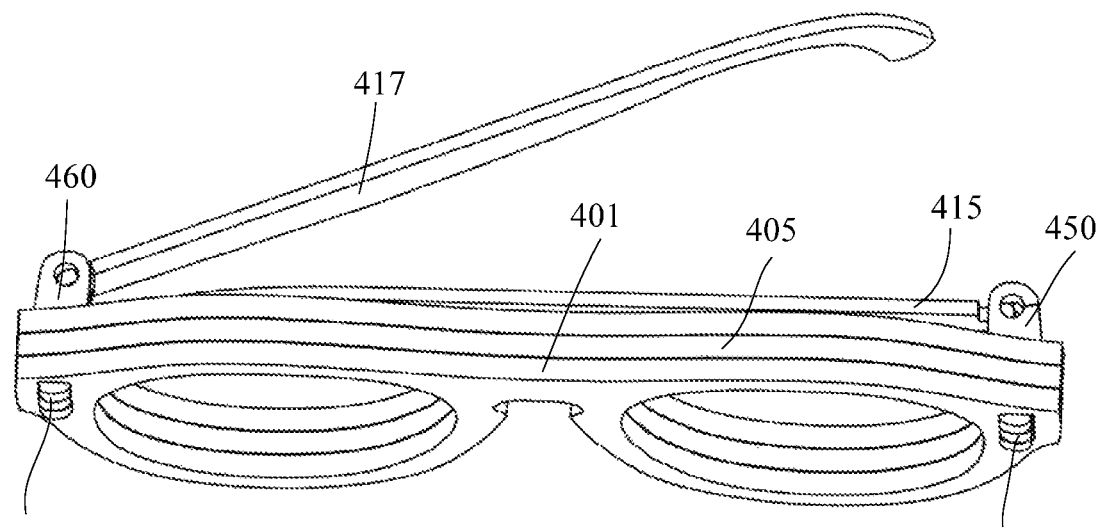
FIG. 17 is a top perspective view of an illustration of the embodiment of the modular spectacles including a three-piece frame element, according to an example embodiment.

FIG. 17 is a top perspective view of an illustration of the embodiment of the modular spectacles including a three-piece frame element, according to an example embodiment. The modular spectacles 400 may be assembled and disassembled without the use of tools. The modular spectacles 400 comprise a pair of lenses (a left lens and right lens), a frame assembly 405 that holds the pair of lenses, a pair of three-part hinge sets 450, 460 (a left-side three-part hinge set 450, and right-side three-part hinge set 460), and a pair of temples 415, 417 (a left temple 415, and right temple 417).

The frame assembly 405 may include a pair of rims that define a pair of orifices that accept the pair of lenses, wherein the pair of rims are joined by a bridge 401.

The left-side three-part hinge set 450 is seen extending through the frame assembly 405 and secured to the frame assembly 405. The right-side three-part hinge set 460 is also seen extending through the frame assembly 405 and secured to the frame assembly 405. The left temple 415 is seen hingably coupled to the left-side three-part hinge set 450. The right temple 417 is also seen hingably coupled to the right-side three-part hinge set 460.

Figure 18:
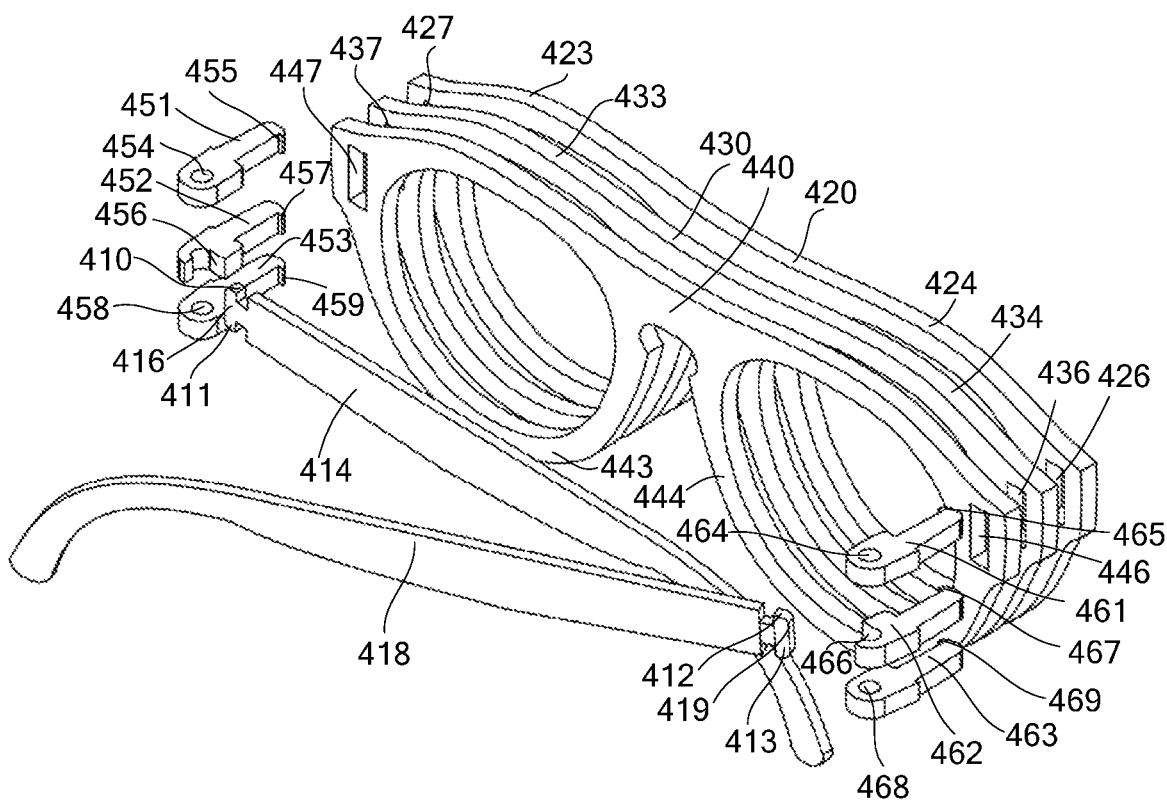
FIG. 18 is a top perspective and exploded view of an illustration of the embodiment of the modular spectacles including a three-piece frame element, according to an example embodiment.

FIG. 18 is a top perspective and exploded view of an illustration of the embodiment of the modular spectacles including a three-piece frame element, according to an example embodiment. The frame assembly 405 is composed of three frame elements: a front frame element 420, a middle frame element 430, and a rear frame element 440.

The middle frame element 430 includes a pair of rims 433, 434 defining orifices for accepting the pair of lenses, a slot 436 on a right side of the middle frame element 430 and a slot 437 on a left side of the middle frame element 430. The slots 436, 437 of the middle frame element 430 may comprise rectangular orifices.

The front frame element 420 has a length that is substantially coextensive with a length of the middle frame element 430, a slot 426 on a right side of the front frame element 420, and a slot 427 on a left side of the front frame element 420. The slots 426, 427 of the front frame element 420 may also comprise rectangular orifices.

The rear frame element 440 has a length that is substantially coextensive with a length of the middle frame element 430, a slot 446 on a right side of the rear frame element 440, and a slot 447 on a left side of the rear frame element 440. The slots 446, 447 of the rear frame element 440 may also comprise rectangular orifices.

FIG. 18 shows that front frame element 420 has a full pair of rims 423, 424 defining substantially complete circles or ellipses. In one embodiment, the front frame element further comprises a portion that is coextensive with at least a portion of the pair of rims 433, 434 of the middle frame element 430. That is, in one embodiment, the front frame element 420 includes a pair of rims that each defines a portion of a circle or ellipse.

FIG. 18 shows that rear frame element 440 has a full pair of rims 443, 444 defining substantially complete circles or ellipses. In one embodiment, the rear frame element 440 further comprises a portion that is coextensive with at least a portion of the pair of rims 433, 434 of the middle frame element 430. That is, in one embodiment, the rear frame element 440 includes a pair of rims that each defines a portion of a circle or ellipse.

When the front frame element 420 is placed in front of the middle frame element 430, the slots 426, 427 of the front frame element 420 are aligned with the slots 436, 437 of the middle frame element 430, and portions of the front frame element 420 extend over a portion of the orifices defined by the pair of rims 433, 434. That is, the orifice defined by the pair of rims 423, 424 of the front frame element 420 may be smaller than the orifice defined by the pair of rims 433, 434 of the middle frame element 430, such that portions of the front frame element 420 extend over the orifices defined by the pair of rims 433, 434. The front frame element 420 is not provided with any lenses to be secured within the pair of rims 423, 424.

When the rear frame element 440 is placed behind the middle frame element 430, the slots 436, 437 of the middle frame element 430 are aligned with the slots 446, 447 of the rear frame element 440, and portions of the rear frame element 440 extend over a portion of the orifices defined by the pair of rims 433, 434. That is, the orifice defined by the pair of rims 443, 444 of the rear frame element 440 may be smaller than the orifice defined by the pair of rims 433, 434 of the middle frame element 430, such that portions of the rear frame element 440 extend over the orifices defined by the pair of rims 433, 434. The rear frame element 440 is not provided with any lenses to be secured within the pair of rims 443, 444.

The left-side three-part hinge set 450 comprises a first hinge part 451 including an orifice 454 on one end and a hook 455 on the other end, a second hinge part 452 including a cutout 456 on one end and a hook 457 on the other end, and a third hinge part 453 including an orifice 458 on one end and a hook 459 on the other end.

The orifice 454 of the first hinge part 451, the cutout 456 of the second hinge part 452 and the orifice 458 of the third hinge part 453 are aligned, and the hook 455 of the first hinge part 451, the hook 457 of the second hinge part 452, and the hook 459 of the third hinge part 453 are aligned, when the first, second and third hinge parts 451, 452, 453 are placed on top of each other. The hooks 455, 457, 459 are inserted into the slots 427, 437, 447 of the front, middle and rear frame element 420, 430, 440, such that the left-side three-part hinge set 450 fits securely within the slots 427, 437, 447 of the front, middle and rear frame element 420, 430, 440.

The right-side three-part hinge set 460 comprises a first hinge part 461 including an orifice 464 on one end and a hook 465 on the other end, a second hinge part 462 including a cutout 466 on one end and a hook 467 on the other end, and a third hinge part 463 including an orifice 468 on one end and a hook 469 on the other end.

The orifice 464 of the first hinge part 461, the cutout 466 of the second hinge part 462 and the orifice 468 of the third hinge part 463 are aligned, and the hook 465 of the first hinge part 461, the hook 467 of the second hinge part 462, and the hook 469 of the third hinge part 463 are aligned, when the first, second and third hinge parts 461, 462, 463 are placed on top of each other. The hooks 465, 467, 469 are inserted into the slots 426, 436, 446 of the front, middle and rear frame elements 420, 430, 440, such that the right-side three-part hinge set 460 fits securely within the slots 426, 436, 446 of the front, middle and rear frame elements 420, 430, 440.

The left temple 415 includes an elongated portion 414 and a fastener 416 on one end. When the left-side three-part hinge set 450 is assembled, the fastener 416 is inserted securely into the left-side three-part hinge set 450 such that the left temple 415 is hingably coupled to the left-side three-part hinge set 450.

The fastener 416 may be a double-hook portion and include a first hook 410 on the top, a second hook 411 on the bottom, and a middle portion between the first hook 410 and the second hook 411. The first hook 410 of the double-hook portion is inserted into the orifice 454 of the first hinge part 451 of the left-side three-part hinge set 450, the second hook 411 of the double-hook portion is inserted into the orifice 458 of the third hinge part 453 of the left-side three-part hinge set 450, and the middle portion of the double-hook portion is inserted into the cutout 456 of the second hinge part 452 of the left-side three-part hinge set 450, such that the left temple 415 is hingably coupled to the left-side three-part hinge set 450.

The right temple 417 includes an elongated portion 418 and a fastener 419 on one end. When the right-side three-part hinge set 460 is assembled, the fastener 419 is inserted securely into the right-side three-part hinge set 460 such that the right temple 417 is hingably coupled to the right-side three-part hinge set 460.

The fastener 419 may be a double-hook portion and include a first hook 412 on the top, a second hook 413 on the bottom, and a middle portion between the first hook 412 and the second hook 413. The first hook 412 of the double-hook portion is inserted into the orifice 464 of the first hinge part 461 of the right-side three-part hinge set 460, the second hook 413 of the double-hook portion is inserted into the orifice 468 of the third hinge part 463 of the right-side three-part hinge set 460, and the middle portion of the double-hook portion is inserted into the cutout 466 of the second hinge part 462 of the right-side three-part hinge set 460, such that the right temple 417 is hingably coupled to the right-side three-part hinge set 460.

Figure 19:
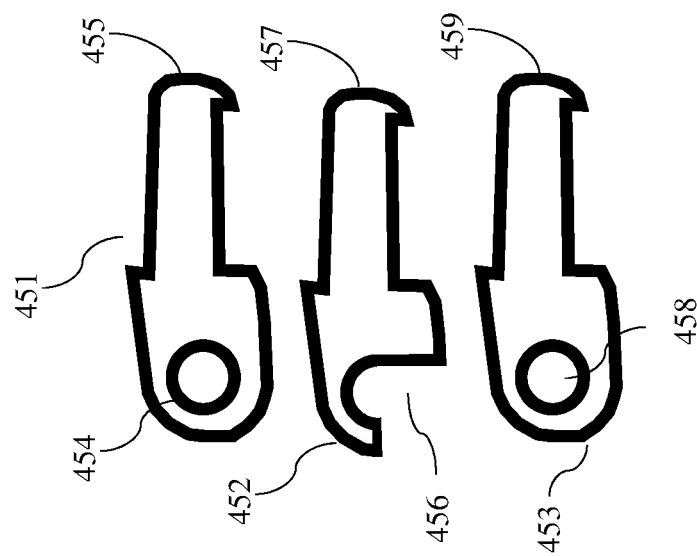
FIG. 19 is a top view of an illustration of the three-part hinge set of the modular spectacles, according to an example embodiment.

FIG. 19 is a top view of an illustration of the three-part hinge set 450 of the modular spectacles, according to an example embodiment. The left-side three-part hinge set 450 comprises a first hinge part 451 including an orifice 454 on one end and a hook 455 on the other end, a second hinge part 452 including a cutout 456 on one end and a hook 457 on the other end, and a third hinge part 453 including an orifice 458 on one end and a hook 459 on the other end.

The orifice 454 of the first hinge part 451, the cutout 456 of the second hinge part 452 and the orifice 458 of the third hinge part 453 are aligned, and the hook 455 of the first hinge part 451, the hook 457 of the second hinge part 452, and the hook 459 of the third hinge part 453 are aligned, when the first, second and third hinge parts 451, 452, 453 are placed on top of each other.

Figure 20:
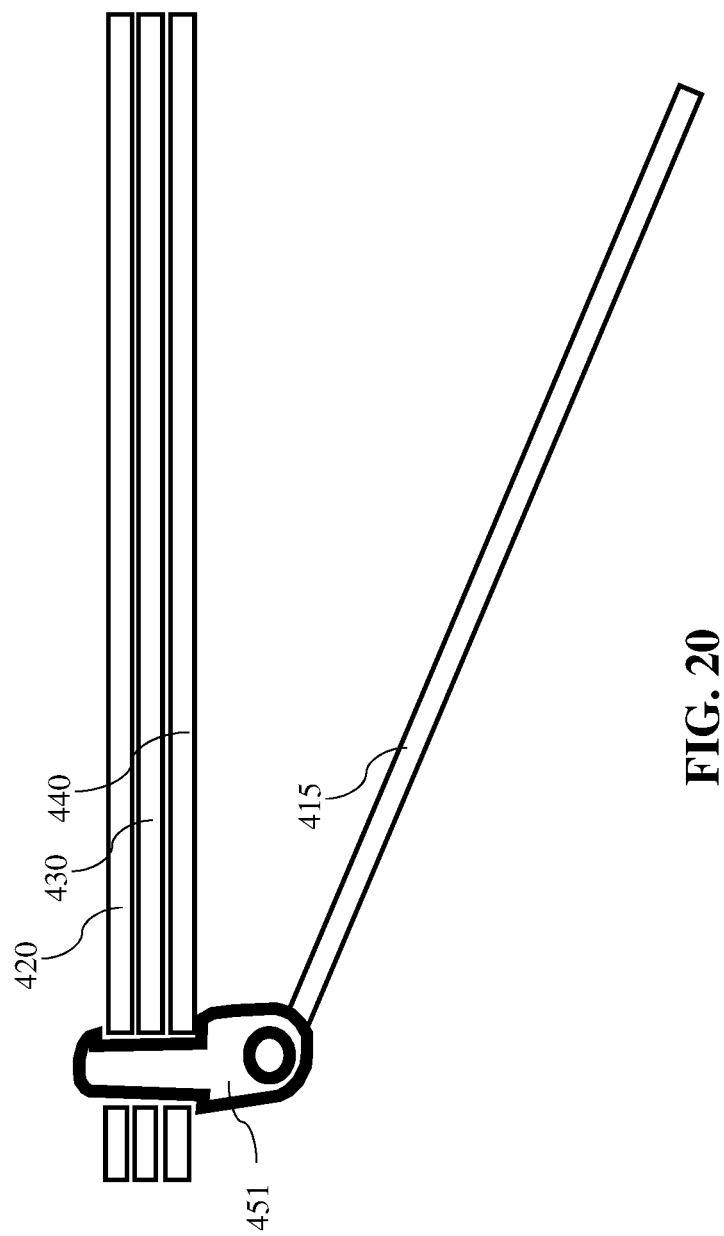
FIG. 20 is a top view of an illustration of the three-part hinge set inserted into the three-piece frame of the modular spectacles, according to an example embodiment.

FIG. 20 is a top view of an illustration of the three-part hinge set 450 inserted into the three-piece frame of the modular spectacles, according to an example embodiment. FIG. 20 shows the top piece 451 of the three-part hinge set 450 has been inserted into the left side slots of the front, middle and rear frame elements 420, 430, 440. FIG. 20 also shows that temple 415 has been fastened to the three-part hinge set 450.

Figure 21:
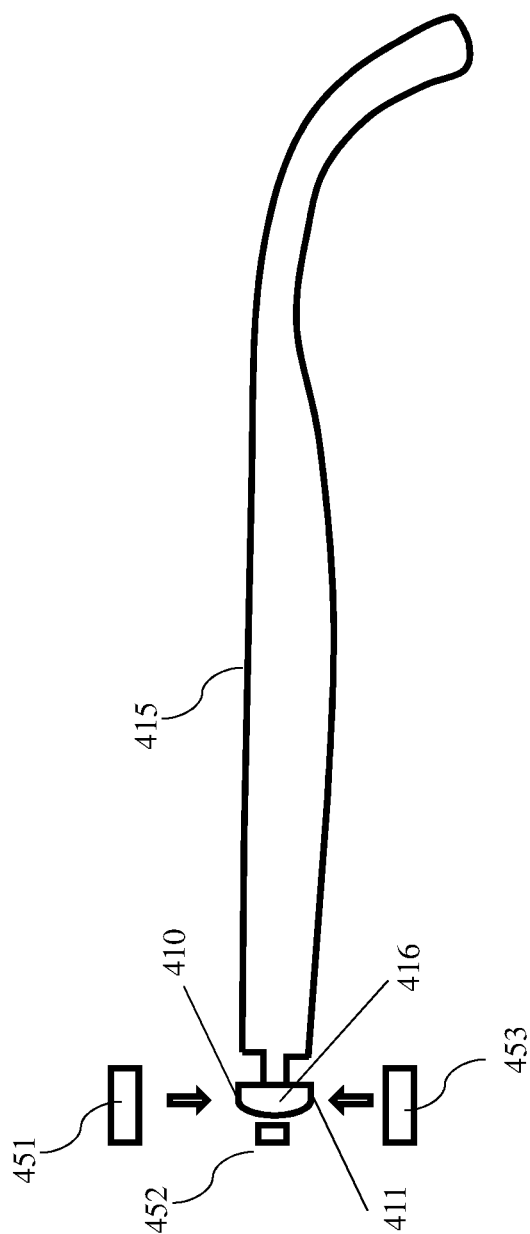
FIG. 21 is a side view showing the placement of the three-part hinge set about a temple of the module spectacles, according to an example embodiment.

FIG. 21 is a side view showing the placement of the three-part hinge set 450 about a temple 415 of the module spectacles, according to an example embodiment. The left temple 415 includes an elongated portion 414 and a fastener 416 on one end. When the left-side three-part hinge set 450 is assembled, the fastener 416 is inserted securely into the left-side three-part hinge set 450 such that the left temple 415 is hingably coupled to the left-side three-part hinge set 450.

The fastener 416 may be a double-hook portion and include a first hook 410 on the top, a second hook 411 on the bottom, and a middle portion between the first hook 410 and the second hook 411. The first hook 410 of the double-hook portion is inserted into the orifice 454 of the first hinge part 451 of the left-side three-part hinge set 450, the second hook 411 of the double-hook portion is inserted into the orifice 458 of the third hinge part 453 of the left-side three-part hinge set 450, and the middle portion of the double-hook portion is inserted into the cutout 456 of the second hinge part 452 of the left-side three-part hinge set 450, such that the left temple 415 is hingably coupled to the left-side three-part hinge set 450.

Figure 22:
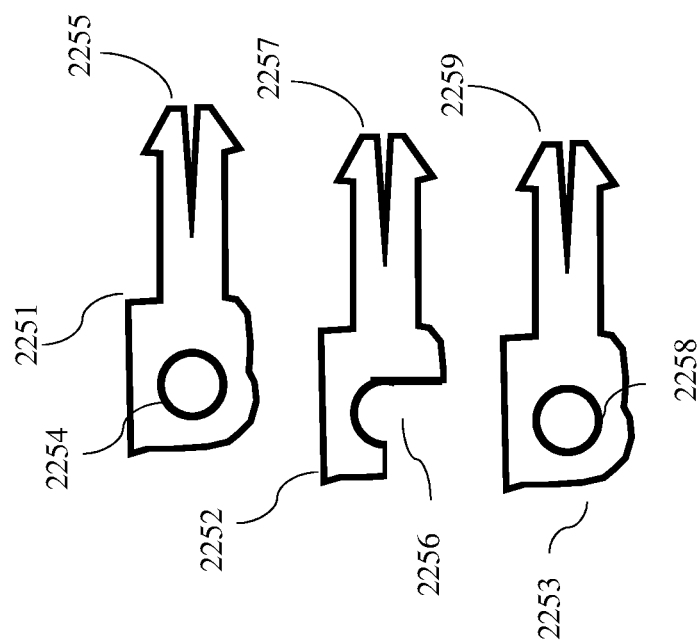
FIG. 22 is a top view of an illustration of a second embodiment of the three-part hinge set of the modular spectacles, according to an example embodiment.

FIG. 22 is a top view of an illustration of a second embodiment of the three-part hinge set 450 of the modular spectacles, according to an example embodiment. The left-side three-part hinge set 450 comprises, in this embodiment, a first hinge part 2251 including an orifice 2254 on one end and a compressible end 2255 on the other end, a second hinge part 2252 including a cutout 2256 on one end and a compressible end 2257 on the other end, and a third hinge part 2253 including an orifice 2258 on one end and a compressible end 2259 on the other end.

The orifice 2254 of the first hinge part 2251, the cutout 2256 of the second hinge part 2252 and the orifice 2258 of the third hinge part 2253 are aligned, and the compressible end 2255 of the first hinge part 251, the compressible end 2257 of the second hinge part 2252, and the compressible end 2259 of the third hinge part 2253 are aligned, when the first, second and third hinge parts 2251, 2252, 2253 are placed on top of each other.

When said compressible ends are compressed, inserted into said slots, and released, said compressible ends expand and are secured within said slots. Once inserted into said slots, the compressible ends may be released, which results in the compressible ends expanding (in a direction opposite to the arrows in FIG. 6) and pushing against the interior surface of the slots of the rear, middle and front frame elements. As explained above, the compressible ends of the temples 115, 117 can be compressed using one's fingers, such that the split arms 655, 657 are brought together. In this fashion, when compressed, the ends of the split arms may be inserted into the slots of the rear, middle and front frame elements 540, 530, 520 when they are stacked in a sandwich formation. Therefore, the temples maintain the rear, middle and front frame elements securely in place.

Figure 23:
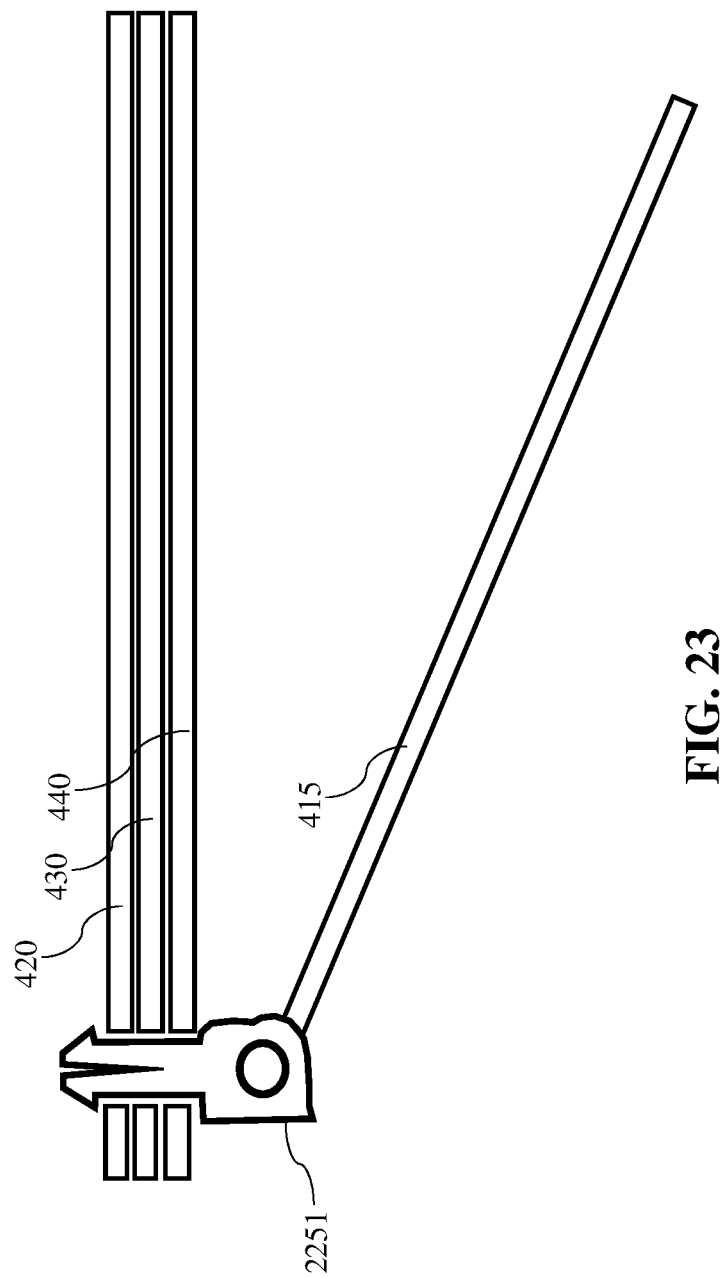
FIG. 23 is a top view of an illustration of the second embedment of the three-part hinge set inserted into the three-piece frame of the modular spectacles, according to an example embodiment.

FIG. 23 is a top view of an illustration of the second embedment of the three-part hinge set 450 inserted into the three-piece frame of the modular spectacles, according to an example embodiment. FIG. 23 shows the compressible end of the top piece 2251 of the three-part hinge set 450 has been inserted into the left side slots of the front, middle and rear frame elements 420, 430, 440. FIG. 23 also shows that temple 415 has been fastened to the three-part hinge set 450.

When the compressible ends 2255, 2257, 2259 are compressed, inserted into the left side slots of the front, and rear frame elements 420, 430, 440, and released, said compressible ends expand and are secured within said slots. Once inserted into said slots, the compressible ends may be released, which results in the compressible ends expanding and pushing against the interior surface of the slots of the rear, middle and front frame elements. The compressible ends 2255, 2257, 2259 can be compressed using one's fingers, such that the split arms are brought together. In this fashion, when compressed, the ends of the split arms may be inserted into the slots of the rear, middle and front frame elements 420, 430, 440 when they are stacked in a sandwich formation. Therefore, the compressible ends maintain the rear, middle and front frame elements securely in place.

Figure 24:
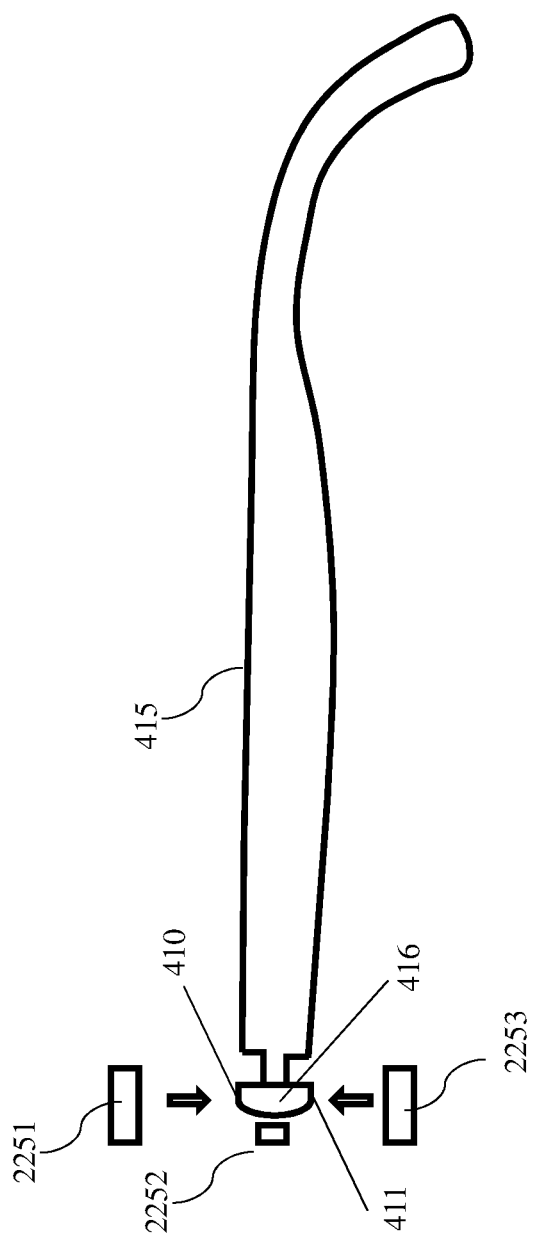
FIG. 24 is a side view showing the placement of the second embodiment of the three-part hinge set about a temple of the module spectacles, according to an example embodiment.

FIG. 24 is a side view showing the placement of the second embodiment of the three-part hinge set 450 about a temple 415 of the module spectacles, according to an example embodiment. The left temple 415 includes an elongated portion 414 and a fastener 416 on one end. When the left-side three-part hinge set 450 is assembled, the fastener 416 is inserted securely into the left-side three-part hinge set 450 such that the left temple 415 is hingably coupled to the left-side three-part hinge set 450.

The fastener 416 may be a double-hook portion and include a first hook 410 on the top, a second hook 411 on the bottom, and a middle portion between the first hook 410 and the second hook 411. The first hook 410 of the double-hook portion is inserted into the orifice 2254 of the first hinge part 2251 of the left-side three-part hinge set 450, the second hook 411 of the double-hook portion is inserted into the orifice 2258 of the third hinge part 2253 of the left-side three-part hinge set 450, and the middle portion of the double-hook portion is inserted into the cutout 2256 of the second hinge part 2252 of the left-side three-part hinge set 450, such that the left temple 415 is hingably coupled to the left-side three-part hinge set 450.

The second embodiment of the three-part hinge set 450 of the modular spectacles, as shown in FIGS. 22, 23 and 24, may be used in a single piece frame set, as shown in FIGS. 10-12, in a two-piece frame set, as shown in FIGS. 13-15, and in a three-piece frame set, as shown in FIGS. 16-18.

In one embodiment, any of the components of the modular spectacles 100, 200, 300, 400 described above may be composed of wood, metal, alloy, cement, ceramic, plastic, rubber, any thermoset elastomer, polyethylene, PVC, any combination of the foregoing, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. Modular spectacles that are assembled and disassembled without the use of tools, comprising:
  a) a pair of lenses;
  b) a frame element including a pair of rims defining orifices for accepting the pair of lenses and holding said pair of lenses securely, and a slot located on each side of the frame element;
  c) a pair of three-part hinge sets, each three-part hinge set comprising:
    i) a first hinge part including an orifice on one end and a compressible end on the other end,
    ii) a second hinge part including a cutout on one end and a compressible end on the other end, and
    iii) a third hinge part including an orifice on one end and a compressible end on the other end,
    iv) wherein the orifice of the first hinge part, the cutout of the second hinge part and the orifice of the third hinge part are aligned when the first, second and third hinge parts are placed on top of each other, wherein the three-part hinge set fits securely within a slot in the frame element; and
  d) a pair of temples, each temple including an elongated portion and a fastener on one end, wherein when a three-part hinge set is assembled, the fastener is inserted securely into the three-part hinge set such that the temple is hingably coupled to the three-part hinge set;
  e) wherein a first set of the pair of three-part hinge sets is inserted securely into a first slot on a first side of the frame element, a first temple of the pair of temples is inserted securely into the first set of the pair of three-part hinge sets, a second set of the pair of three-part hinge sets is inserted securely into a second slot on a second side of the frame element, and a second temple of the pair of temples is inserted securely into the second set of the pair of three-part hinge sets.

2. The modular spectacles of claim 1, wherein the frame element further comprises a bridge for coupling the pair of rims.

3. The modular spectacles of claim 2, wherein the first slot on a first side of the frame element further comprises a rectangular orifice.

4. The modular spectacles of claim 3, wherein the second slot on a second side of the frame element further comprises a rectangular orifice.

5. Modular spectacles that are assembled and disassembled without the use of tools, comprising:
  a) a pair of lenses;
  b) a front frame element including a pair of rims defining orifices for accepting the pair of lenses, a slot on a right side of the front frame element and a slot on a left side of the front frame element;
  c) a rear frame element having a length that is substantially coextensive with a length of the front frame element, a slot on a right side of the rear frame element and a slot on a left side of the rear frame element, such that the slots of the front frame element are aligned with the slots of the rear frame element, when the front frame element is placed on top of the rear frame element;
  d) a left-side three-part hinge set comprising:
    i) a first hinge part including an orifice on one end and a compressible end on the other end,
    ii) a second hinge part including a cutout on one end and a compressible end on the other end, and
    iii) a third hinge part including an orifice on one end and a compressible end on the other end,
    iv) wherein the orifice of the first hinge part, the cutout of the second hinge part and the orifice of the third hinge part are aligned when the first, second and third hinge parts are placed on top of each other, wherein the left-side three-part hinge set fits securely within the slots in the left side of the front and rear frame elements, and wherein the front and rear frame elements are prevented from separating by the compressible ends on the first, second and third hinge parts;
  e) a right-side three-part hinge set comprising:
    i) a first hinge part including an orifice on one end and a compressible end on the other end,
    ii) a second hinge part including a cutout on one end and a compressible end on the other end, and
    iii) a third hinge part including an orifice on one end and a compressible end on the other end,
    iv) wherein the orifice of the first hinge part, the cutout of the second hinge part and the orifice of the third hinge part are aligned when the first, second and third hinge parts are placed on top of each other, wherein the right-side three-part hinge set fits securely within the slots in the right side of the front and rear frame elements, and wherein the front and rear frame elements are prevented from separating by the compressible ends on the first, second and third hinge parts;
  f) a left side temple configured for hingably coupling to the left-side three-part hinge set; and
  g) a right side temple configured for hingably coupling to the right-side three-part hinge set.

6. The modular spectacles of claim 5, wherein the front frame element further comprises a bridge for coupling the pair of rims.

7. The modular spectacles of claim 6, wherein the slots of the front frame element further comprise rectangular orifices.

8. The modular spectacles of claim 7, wherein the rear frame element further comprises a portion that is coextensive with at least a portion of the pair of rims of the front frame element.

9. The modular spectacles of claim 8, wherein the slots of the rear frame element further comprise rectangular orifices.

10. Modular spectacles that are assembled and disassembled without the use of tools, comprising:
  a) a pair of lenses;
  b) a middle frame element including a pair of rims defining orifices for accepting the pair of lenses, a slot on a right side of the middle frame element and a slot on a left side of the middle frame element;
  c) a front frame element having a length that is substantially coextensive with a length of the middle frame element, a slot on a right side of the front frame element and a slot on a left side of the front frame element, such that the slots of the front frame element are aligned with the slots of the middle frame element, when the front frame element is placed on top of the middle frame element;
d) a rear frame element having a length that is substantially coextensive with the length of the middle frame element, a slot on a right side of the rear frame element and a slot on a left side of the rear frame element, such that the slots of the rear frame element are aligned with the slots of the middle frame element, when the rear frame element is placed on top of the rear frame element;
e) a left-side three-part hinge set comprising:
  i) a first hinge part including an orifice on one end and a compressible end on the other end,
  ii) a second hinge part including a cutout on one end and a compressible end on the other end, and
  iii) a third hinge part including an orifice on one end and a compressible end on the other end,
  iv) wherein the orifice of the first hinge part, the cutout of the second hinge part and the orifice of the third hinge part are aligned when the first, second and third hinge parts are placed on top of each other, wherein the left-side three-part hinge set fits securely within the slots in the left side of the front, rear and middle frame elements, and wherein the front, rear and middle frame elements are prevented from separating by the compressible ends on the first, second and third hinge parts;
f) a right-side three-part hinge set comprising:
  i) a first hinge part including an orifice on one end and a compressible end on the other end,
  ii) a second hinge part including a cutout on one end and a compressible end on the other end, and
  iii) a third hinge part including an orifice on one end and a compressible end on the other end,
  iv) wherein the orifice of the first hinge part, the cutout of the second hinge part and the orifice of the third hinge part are aligned when the first, second and third hinge parts are placed on top of each other, wherein the right-side three-part hinge set fits securely within the slots in the right side of the front, rear and middle frame elements, and wherein the front, rear and middle frame elements are prevented from separating by the compressible ends on the first, second and third hinge parts;

g) a left side temple including an elongated portion and a double-hook portion on one end, wherein when the left-side three-part hinge set is assembled, a first hook of the double-hook portion is inserted into the orifice of the first hinge part of the left-side three-part hinge set, a second hook of the double-hook portion is inserted into the orifice of the third hinge part of the left-side three-part hinge set, and a middle portion of the double-hook portion is inserted into the cutout of the second hinge part of the left-side three-part hinge set, such that the left side temple is hingably coupled to the left-side three-part hinge set; and h) a right side temple including an elongated portion and a double-hook portion on one end, wherein when the right-side three-part hinge set is assembled, a first hook of the double-hook portion of the right-side temple is inserted into the orifice of the first hinge part of the right-side three-part hinge set, a second hook of the double-hook portion is inserted into the orifice of the third hinge part of the right-side three-part hinge set, and a middle portion of the double-hook portion is inserted into the cutout of the second hinge part of the right-side three-part hinge set, such that the right-side temple is hingably coupled to the right-side three-part hinge set.

11. The modular spectacles of claim 10, wherein the middle frame element further comprises a bridge for coupling the pair of rims.

12. The modular spectacles of claim 11, wherein the slots of the middle frame element further comprise rectangular orifices.

13. The modular spectacles of claim 12, wherein the front frame element further comprises a portion that is coextensive with at least a portion of the pair of rims of the middle frame element.

14. The modular spectacles of claim 13, wherein the slots of the front frame element further comprise rectangular orifices.

15. The modular spectacles of claim 14, wherein the rear frame element further comprises a portion that is coextensive with at least a portion of the pair of rims of the middle frame element.

* * * * *